(12) United States Patent  (10) Patent No.: US 7,715,597 B2
Costache et al.  (45) Date of Patent: May 11, 2010

(54) METHOD AND COMPONENT FOR IMAGE RECOGNITION

(75) Inventors: Gabriel Costache, Navodari Constanta (RO); Peter Corcoran, Claregalway (IE); Rhys Mulryan, Corrandulla (IE); Eran Steinberg, San Francisco, CA (US)

(73) Assignee: FotoNation Ireland Limited, Galway (IE)

( * ) Notice: Subject to any disclaimer, the term of this patent is extended or adjusted under 35 U.S.C. 154(b) by 1316 days.

(21) Appl. No.: 11/027,001

(22) Filed: Dec. 29, 2004

(65) Prior Publication Data

US 2006/0140455 A1   Jun. 29, 2006

(51) Int. Cl.
 *G06K 9/00* (2006.01)
 *G06K 9/62* (2006.01)
(52) U.S. Cl. .......................... 382/118; 382/159; 382/224
(58) Field of Classification Search ................. 382/118, 382/159, 224, 305, 160, 165, 170, 181, 225, 382/226, 227, 228; 700/47, 50; 706/15, 706/19, 20, 22, 41
See application file for complete search history.

(56) References Cited

U.S. PATENT DOCUMENTS

| 4,047,187 | A | 9/1977 | Mashimo et al. |
| 4,317,991 | A | 3/1982 | Stauffer |
| 4,376,027 | A | 3/1983 | Smith et al. |
| RE031,370 | E | 9/1983 | Mashimo et al. |
| 4,638,364 | A | 1/1987 | Hiramatsu |
| 5,018,017 | A | 5/1991 | Sasaki et al. |
| RE033,682 | E | 9/1991 | Hiramatsu |
| 5,063,603 | A | 11/1991 | Burt |
| 5,164,831 | A | 11/1992 | Kuchta et al. |

(Continued)

FOREIGN PATENT DOCUMENTS

GB   2370438 A1   6/2002

(Continued)

OTHER PUBLICATIONS

Chen, et al., "Face annotation for family photo album management," International Journal of Image and Graphics, vol. 3, No. 1 (2003).

(Continued)

*Primary Examiner*—Brian Q Le
(74) *Attorney, Agent, or Firm*—Andrew V. Smith

(57) ABSTRACT

A method and system for image recognition in a collection of digital images includes training image classifiers and retrieving a sub-set of images from the collection. For each image in the collection, any regions within the image that correspond to a face are identified. For each face region and any associated peripheral region, feature vectors are determined for each of the image classifiers. The feature vectors are stored in association with data relating to the associated face region. At least one reference region including a face to be recognized is/are selected from an image. At least one classifier on which said retrieval is to be based is/are selected from the image classifiers. A respective feature vector for each selected classifier is determined for the reference region. The sub-set of images is retrieved from within the image collection in accordance with the distance between the feature vectors determined for the reference region and the feature vectors for face regions of the image collection.

31 Claims, 20 Drawing Sheets
(20 of 20 Drawing Sheet(s) Filed in Color)

U.S. PATENT DOCUMENTS

| | | | |
|---|---|---|---|
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,311,240 A | 5/1994 | Wheeler |
| 5,384,912 A | 1/1995 | Ogrinc et al. |
| 5,430,809 A | 7/1995 | Tomitaka |
| 5,432,863 A | 7/1995 | Benati et al. |
| 5,488,429 A | 1/1996 | Kojima et al. |
| 5,496,106 A | 3/1996 | Anderson |
| 5,576,759 A | 11/1996 | Kawamura et al. |
| 5,633,678 A | 5/1997 | Parulski et al. |
| 5,638,136 A | 6/1997 | Kojima et al. |
| 5,642,431 A | 6/1997 | Poggio et al. |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,724,456 A | 3/1998 | Boyack et al. |
| 5,744,129 A | 4/1998 | Dobbs et al. |
| 5,745,668 A | 4/1998 | Poggio et al. |
| 5,774,129 A | 6/1998 | Poggio et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,852,823 A | 12/1998 | De Bonet |
| 5,870,138 A | 2/1999 | Smith et al. |
| 5,911,139 A | 6/1999 | Jain et al. |
| 5,911,456 A | 6/1999 | Tsubouchi et al. |
| 5,978,519 A | 11/1999 | Bollman et al. |
| 5,991,456 A | 11/1999 | Rahman et al. |
| 6,053,268 A | 4/2000 | Yamada |
| 6,072,904 A | 6/2000 | Desai et al. |
| 6,097,470 A | 8/2000 | Buhr et al. |
| 6,101,271 A | 8/2000 | Yamashita et al. |
| 6,128,397 A | 10/2000 | Baluja et al. |
| 6,142,876 A | 11/2000 | Cumbers |
| 6,148,092 A | 11/2000 | Qian |
| 6,188,777 B1 | 2/2001 | Darrell et al. |
| 6,192,149 B1 | 2/2001 | Eschbach et al. |
| 6,234,900 B1 | 5/2001 | Cumbers |
| 6,246,790 B1 | 6/2001 | Huang et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luo et al. |
| 6,301,370 B1 | 10/2001 | Steffens et al. |
| 6,332,033 B1 | 12/2001 | Qian |
| 6,349,373 B2 | 2/2002 | Sitka et al. |
| 6,351,556 B1 | 2/2002 | Loui et al. |
| 6,389,181 B2 | 5/2002 | Shaffer et al. |
| 6,393,148 B1 | 5/2002 | Bhaskar |
| 6,400,470 B1 | 6/2002 | Takaragi et al. |
| 6,400,830 B1 | 6/2002 | Christian et al. |
| 6,404,900 B1 | 6/2002 | Qian et al. |
| 6,407,777 B1 | 6/2002 | DeLuca |
| 6,418,235 B1 | 7/2002 | Morimoto et al. |
| 6,421,468 B1 | 7/2002 | Ratnakar et al. |
| 6,430,307 B1 | 8/2002 | Souma et al. |
| 6,430,312 B1 | 8/2002 | Huang et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,554,705 B1 | 4/2003 | Cumbers |
| 6,556,708 B1 | 4/2003 | Christian et al. |
| 6,564,225 B1 | 5/2003 | Brogliatti et al. |
| 6,567,775 B1 | 5/2003 | Maali et al. |
| 6,567,983 B1 | 5/2003 | Shiimori |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,754,389 B1 | 6/2004 | Dimitrova et al. |
| 6,760,465 B2 | 7/2004 | McVeigh et al. |
| 6,765,612 B1 | 7/2004 | Anderson et al. |
| 6,783,459 B2 | 8/2004 | Cumbers |
| 6,801,250 B1 | 10/2004 | Miyashita |
| 6,826,300 B2 * | 11/2004 | Liu et al. ................... 382/159 |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,928,231 B2 | 8/2005 | Tajima |
| 6,940,545 B1 | 9/2005 | Ray et al. |
| 6,965,684 B2 | 11/2005 | Chen et al. |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,035,456 B2 | 4/2006 | Lestideau |
| 7,035,467 B2 | 4/2006 | Nicponski |
| 7,038,709 B1 | 5/2006 | Verghese |
| 7,038,715 B1 | 5/2006 | Flinchbaugh |
| 7,046,339 B2 | 5/2006 | Stanton et al. |
| 7,050,607 B2 | 5/2006 | Li et al. |
| 7,064,776 B2 | 6/2006 | Sumi et al. |
| 7,082,212 B2 | 7/2006 | Liu et al. |
| 7,092,555 B2 | 8/2006 | Lee et al. |
| 7,099,510 B2 | 8/2006 | Jones et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,175,528 B1 | 2/2007 | Cumbers |
| 7,187,786 B2 | 3/2007 | Kee |
| 7,190,829 B2 | 3/2007 | Zhang et al. |
| 7,200,249 B2 | 4/2007 | Okubo et al. |
| 7,218,759 B1 | 5/2007 | Ho et al. |
| 7,227,976 B1 | 6/2007 | Jung et al. |
| 7,254,257 B2 * | 8/2007 | Kim et al. ................... 382/118 |
| 7,274,822 B2 | 9/2007 | Zhang et al. |
| 7,274,832 B2 | 9/2007 | Nicponski |
| 7,317,816 B2 * | 1/2008 | Ray et al. ................... 382/118 |
| 7,324,670 B2 | 1/2008 | Kozakaya et al. |
| 7,330,570 B2 | 2/2008 | Sogo et al. |
| 7,357,717 B1 | 4/2008 | Cumbers |
| 7,440,594 B2 | 10/2008 | Takenaka |
| 2001/0028731 A1 | 10/2001 | Covell et al. |
| 2001/0031129 A1 | 10/2001 | Tajima |
| 2001/0031142 A1 | 10/2001 | Whiteside |
| 2002/0105662 A1 | 8/2002 | Patton et al. |
| 2002/0106114 A1 | 8/2002 | Yan et al. |
| 2002/0113879 A1 | 8/2002 | Battle et al. |
| 2002/0114535 A1 | 8/2002 | Luo |
| 2002/0132663 A1 | 9/2002 | Cumbers |

| | | |
|---|---|---|
| 2002/0136433 A1 | 9/2002 | Lin |
| 2002/0141586 A1 | 10/2002 | Margalit et al. |
| 2002/0168108 A1 | 11/2002 | Loui et al. |
| 2002/0172419 A1 | 11/2002 | Lin et al. |
| 2003/0025812 A1 | 2/2003 | Slatter |
| 2003/0035573 A1 | 2/2003 | Duta et al. |
| 2003/0048926 A1 | 3/2003 | Watanabe |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0084065 A1 | 5/2003 | Lin et al. |
| 2003/0086134 A1 | 5/2003 | Enomoto |
| 2003/0086593 A1 | 5/2003 | Liu et al. |
| 2003/0107649 A1 | 6/2003 | Flickner et al. |
| 2003/0118216 A1 | 6/2003 | Goldberg |
| 2003/0122839 A1 | 7/2003 | Matraszek et al. |
| 2003/0128877 A1 | 7/2003 | Nicponski |
| 2003/0156202 A1 | 8/2003 | van Zee |
| 2003/0158838 A1 | 8/2003 | Okusa |
| 2003/0198368 A1 | 10/2003 | Kee |
| 2003/0210808 A1 | 11/2003 | Chen et al. |
| 2004/0136574 A1 | 7/2004 | Kozakaya et al. |
| 2004/0145660 A1 | 7/2004 | Kusaka |
| 2004/0210763 A1 | 10/2004 | Jonas |
| 2004/0213454 A1* | 10/2004 | Lai et al. ............ 382/159 |
| 2004/0223063 A1 | 11/2004 | DeLuca et al. |
| 2004/0264780 A1 | 12/2004 | Zhang et al. |
| 2005/0013479 A1 | 1/2005 | Xiao et al. |
| 2005/0036676 A1* | 2/2005 | Heisele ............ 382/159 |
| 2005/0063569 A1 | 3/2005 | Colbert et al. |
| 2005/0069208 A1 | 3/2005 | Morisada |
| 2005/0129278 A1 | 6/2005 | Rui et al. |
| 2006/0006077 A1 | 1/2006 | Mosher et al. |
| 2006/0018521 A1* | 1/2006 | Avidan ............ 382/118 |
| 2006/0104488 A1 | 5/2006 | Bazakos et al. |
| 2006/0120599 A1 | 6/2006 | Steinberg et al. |
| 2006/0140055 A1 | 6/2006 | Ehrsam et al. |
| 2006/0177100 A1 | 8/2006 | Zhu et al. |
| 2006/0177131 A1 | 8/2006 | Porikli |
| 2006/0228040 A1 | 10/2006 | Simon et al. |
| 2006/0239515 A1 | 10/2006 | Zhang et al. |
| 2006/0251292 A1 | 11/2006 | Gokturk et al. |
| 2007/0011651 A1 | 1/2007 | Wagner |
| 2007/0091203 A1 | 4/2007 | Peker et al. |
| 2007/0098303 A1 | 5/2007 | Gallagher et al. |
| 2007/0154095 A1 | 7/2007 | Cao et al. |
| 2007/0154096 A1 | 7/2007 | Cao et al. |
| 2008/0137919 A1 | 6/2008 | Kozakaya et al. |
| 2008/0144966 A1 | 6/2008 | Steinberg et al. |

FOREIGN PATENT DOCUMENTS

| | | |
|---|---|---|
| JP | 5260360 A2 | 10/1993 |
| WO | WO-2007142621 A1 | 12/2007 |
| WO | WO-2008015586 A2 | 2/2008 |

OTHER PUBLICATIONS

Chang et al., "Texture analysis and classification with tree-structured wavelet transform," IEEE Trans. Image Processing 2(4), 429 (1993).

"CBIR method based on color-spatial feature," IEEE Region 10th Ann. Int. Conf. 1999 (TENCON'99, Cheju, Korea, 1999).

Huang et al., "Image indexing using color correlograms," In IEEE Conf. Computer Vision and Pattern Recognition, pp. 762 et seq (1997).

H. Lai, P. C. Yuen, and G. C. Feng, "Face recognition using holistic Fourier invariant features" Pattern Recognition, vol. 34, pp. 95-109, 2001.

Stricker et al., "Similarity of color images," SPIE Proc. pp. 2420 (1995).

St Hyadi et al., "Application of the DCT Energy Histogram for Face Recognition", in Proceedings of the 2nd International Conference on Information Technology for Application (ICITA 2004).

Turk, et al., "Eigenfaces for Recognition," Journal of Cognitive Neuroscience, 3(1), 1991.

Yang et al., "Detecting Faces in Images: A Survey, IEEE Transactions on Pattern Analysis and Machine Intelligence," vol. 24, No. 1, pp. 34-58, Jan. 2002.

Wan et al., "Variance based color image quantization for frame buffer display," Color Res. Applicat., vol. 15, No. 1, pp. 52-58, 1990.

Zhang et al., "Face recognition: eigenface, elastic matching, and neutral nets," Proceedings of the IEEE, vol. 85, No. 9, pp. 1423-1435, Sep. 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9 - Issue 2.

Chang, T., "Texture Analysis and Classification with Tree-Structured Wavelet Transform", IEEE Transactions on Image Processing, 1993, pp. 429-441, vol. 2 - Issue 4.

Corcoran Peter et al., "Combining PCA-based Datasets without Retraining of the Basis Vector Set", IEEE PC, 2007.

Corcoran, P. et al., "Automatic Indexing of Consumer Image Collections Using Person Recognition Techniques", Digest of Technical Papers. International Conference on Consumer Electronics, 2005, pp. 127-128.

Corcoran, Peter et al., "Automated sorting of consumer image collections using face and peripheral region image classifiers", IEEE Transactions on Consumer Electronics, 2005, pp. 747-754, vol. 51 - Issue 3.

Costache, G. et al., "In-Camera Person-Indexing of Digital Images", Digest of Technical Papers. International Conference on Consumer Electronics, 2006, pp. 339-340.

Demirkir, C. et al., "Face detection using boosted tree classifier stages", Proceedings of the IEEE 12th Signal Processing and Communications Applications Conference, 2004, pp. 575-578.

Drimbarean, A.F. et al., "Image Processing Techniques to Detect and Filter Objectionable Images based on Skin Tone and Shape Recognition", International Conference on Consumer Electronics, 2001, pp. 278-279.

Hall, P. et al., "Adding and subtracting eigenspaces with eigenvalue decomposition and singular value decomposition", Image and Vision Computing, 2002, pp. 1009-1016, vol. 20 - Issue 13-14.

Hall, P. et al., "Adding and Subtracting eigenspaces", Proceedings of the British Machine Vision Conference, 1999, pp. 453-462, vol. 2.

Hall, P. et al., "Merging and Splitting Eigenspace Models, XP008081056, ISSN: 0162-8828, Pages Searching Authority, or the Declaration, for PCT Application No. PCT/IB2007/003985, dated Jun. 17, 2008, 20 pages.", IEEE Transactions on Pattern Analysis and MachineIntelligence, 2000, pp. 1042-1049, vol. 22 - Issue 9.

Hall, Peter et al., "Incremental Eigenanalysis for Classification, XP008091807", British Machine Vision Conference, pp. 286-295.

Javier, Melenchon et al., "Efficiently Downdating, Composing and Splitting Singular Value Decompositions Preserving the Mean Information", Pattern Recognition and Image Analysis Lecture Notes in Computer Science, 1990, pp. 436-443, vol. 4478, Springer-Verlag.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Kusumoputro, B. et al., "Development of 3D Face Databases by Using Merging and Splitting Eigenspace Models, retrieved from URL: http://www.wseas.us/e-library/conferences/digest2003lpapersl466-272.pdf on Sep. 16, 2008", WSEAS Trans. on Computers, 2003, pp. 203-209, vol. 2 - Issue 1.

Lei et al., "A CBIR Method Based on Color-Spatial Feature", IEEE Region 10th Ann. Int. Conf., 1999.

Liu, X. et al., "Eigenspace updating for non-stationary Process and its application to face recognition", Pattern Recognition, 2003, pp. 1945-1959, vol. 36 - Issue 9, Elsevier.

PCT Notification of Transmittal of the International Search Report and the Written Opinion of the International Searching Authority, or the Declaration, for PCT Application No. PCT/IB2007/003985, dated Jun. 17, 2008, 20 pages.

PCT Notification of Transmittal of the International Search Report and the Written Opinion of the International Searching Authority, or the Declaration, for PCT Application No. PCT/US2007/75136, dated Oct. 1, 2008, 9 pages.

PCT Notification of Transmittal of the International Search Report and the Written Opinion of the International Searching Authority, or the Declaration, for PCT Application No. PCT/US2008/055831, dated Jun. 24, 2008, 7 pages.

Shah, Agam, "CES: Digital Imaging Market Set to Explode, panel says, The Industry Standard, Internet article www.thestandard.com/article.php?story=20040108174644982", 2004, 2 pages.

Tjahyadi et al., "Application of the DCT Energy Histogram for Face Recognition", Proceedings of the 2nd International Conference on Information Technology for Application, 2004, pp. 305-310.

US Final Office Action dated Oct. 16, 2007, cited in co-pending related application, U.S. Appl. No. 10/764,335, 47 pgs.

US Office Action dated Oct. 3, 2008, cited in co-pending related application, U.S. Appl. No. 10/764,274, 53 pgs.

US Office Action dated Sep. 25, 2008, cited in co-pending related application, U.S. Appl. No. 10/763,801, 50 pgs.

US Office Action dated Sep. 29, 2008, cited in co-pending related application, U.S. Appl. No. 10/764,336, 35 pgs.

US Office Action dated Sep. 29, 2008, cited in co-pending related application, U.S. Appl. No. 10/764,339, 46 pgs.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57 - Issue 2, Kluwer Academic Publishers.

Xin He et al., "Real-Time Human Face Detection in Color Image", International Conference on Machine Learning and Cybernetics, 2003, pp. 2915-2920, vol. 5.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35 - Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

* cited by examiner $$D_{tot} = D_1/M_{C1} + D_2/M_{C2} + \ldots + D_n/M_{Cn}$$
$$= D'_1 + D'_2 + \ldots + D'_n$$

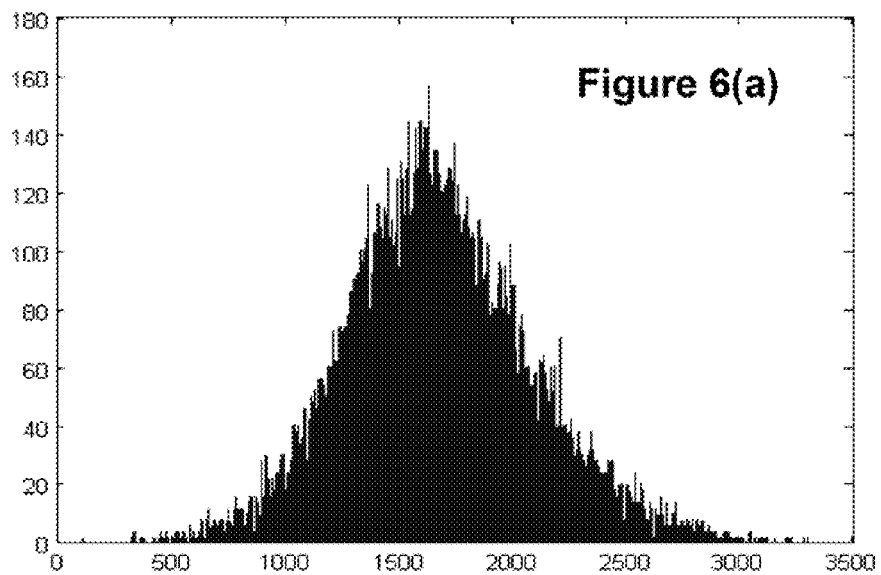
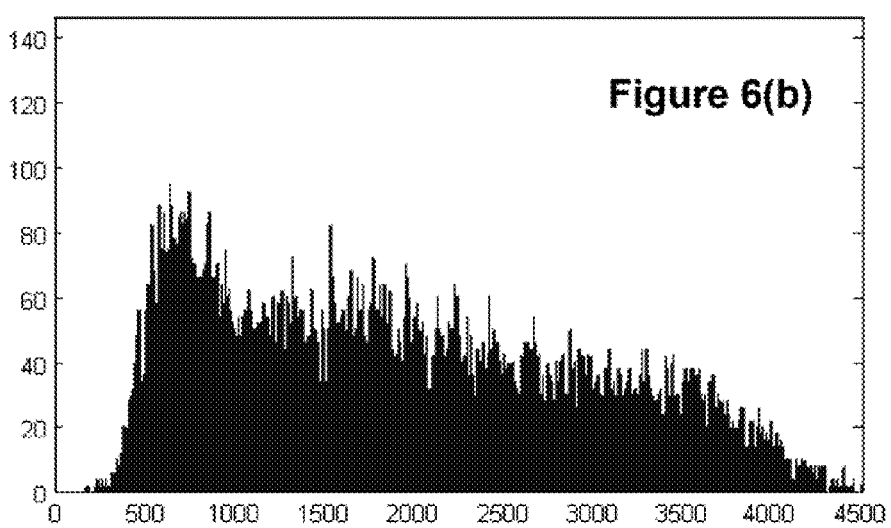
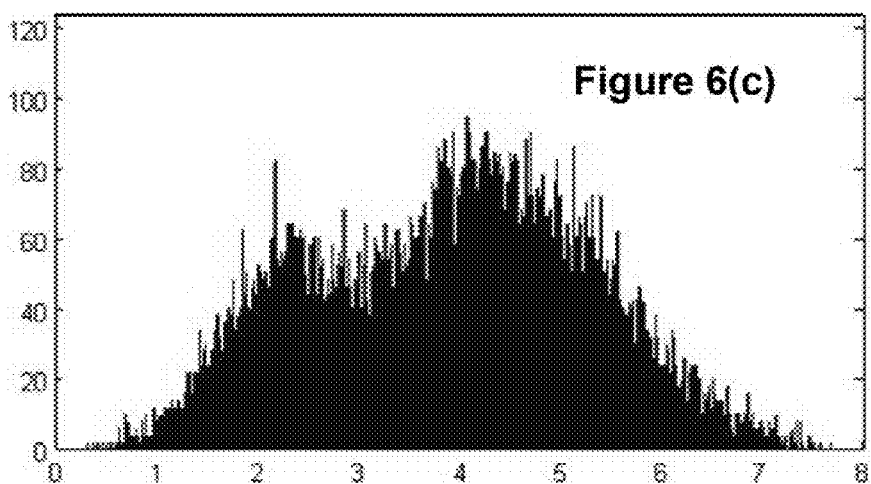

METHOD AND COMPONENT FOR IMAGE RECOGNITION

FIELD OF THE INVENTION

The invention relates to a method and component for image recognition in a collection of digital images. In particular the invention provides improved image sorting, image retrieval, pattern recognition and pattern combination methods associated with image recognition.

DESCRIPTION OF THE RELATED ART

A useful review of face detection is provided by Yang et al., in IEEE Transactions on Pattern Analysis and Machine Intelligence, Vol. 24, No. 1, pages 34-58, January 2002. A review of face recognition techniques is given in Zhang et al., Proceedings of the IEEE, Vol. 85, No. 9, pages 1423-1435, September 1997.

US Application No. 2003/0210808 to Chen et al describes a method of organizing images of human faces in digital images into clusters comprising the steps of locating face regions using a face detector, extracting and normalizing the located face regions and then forming clusters of said face regions, each cluster representing an individual person.

U.S. Pat. No. 6,246,790 to Huang et al discloses image indexing using a colour correlogram technique. A color correlogram is a three-dimensional table indexed by color and distance between pixels which expresses how the spatial correlation of color changes with distance in a stored image. The color correlogram may be used to distinguish an image from other images in a database.

U.S. Pat. No. 6,430,312 also to Huang et al discloses distinguishing objects in an image as well as between images in a plurality of images. By intersecting a color correlogram of an image object with correlograms of images to be searched, those images which contain the objects are identified by the intersection correlogram. Many other techniques for colour pattern matching are described in the prior art.

In "Face annotation for family photo album management" to Chen et al published in the International Journal of Image and Graphics, Vol. 3, No. 1 (2003) techniques, including the colour correlogram, are employed to match persons within an image collection and facilitate the annotation of images based on said matching. Chen et al select a single colour region around a person use a combination of multiple colour pattern matching methods to improve the accuracy of the annotation process.

US 2002/0136433 to Lin et al describes an adaptive face recognition system and method. The system includes a database configured to store a plurality of face classes; an image capturing system for capturing images; a detection system, wherein the detection system detects face images by comparing captured images with a generic face image; a search engine for determining if a detected face image belongs to one of a plurality of known face classes; and a system for generating a new face class for the detected face image if the search engine determines that the detected face image does not belong to one of the known face classes. In the event that the search engine determines that the detected face image belongs to one of the known face classes, an adaptive training system adds the detected face to the associated face class.

In the field of multi-classifier pattern matching, U.S. Pat. No. 6,567,775 to Maali et al discloses a method for identifying a speaker in an audio-video source using both audio and video information. An audio-based speaker identification system identifies one or more potential speakers for a given segment using an enrolled speaker database. A video-based speaker identification system identifies one or more potential speakers for a given segment using a face detector/recognizer and an enrolled face database. An audio-video decision fusion process evaluates the individuals identified by the audio-based and video-based speaker identification systems and determines the speaker of an utterance. A linear variation is imposed on the ranked-lists produced using the audio and video information.

The decision fusion scheme of Maali is based on a linear combination of the audio and the video ranked-lists. The line with the higher slope is assumed to convey more discriminative information. The normalized slopes of the two lines are used as the weight of the respective results when combining the scores from the audio-based and video-based speaker analysis. In this manner, the weights are derived from the data itself but assume that the ranks and the scores for each method have linear variation (are points on a line and they estimate the equation of the line).

SUMMARY OF THE INVENTION

According to the present invention there is provided a method for image recognition in a collection of digital images that includes training image classifiers and retrieving a sub-set of images from the collection. A system is also provided including a training module and image retrieval module.

The training of the image classifiers preferably includes the following: For each image in the collection, any regions within the image that correspond to a face are identified. For each face region and any associated peripheral region, feature vectors are determined for each of the image classifiers. The feature vectors are stored in association with data relating to the associated face region.

The retrieval of the sub-set of images from the collection preferably includes the following: At least one reference region including a face to be recognized is/are selected from an image. At least one classifier on which said retrieval is to be based is/are selected from the image classifiers. A respective feature vector for each selected classifier is determined for the reference region. The sub-set of images is retrieved from within the image collection in accordance with the distance between the feature vectors determined for the reference region and the feature vectors for face regions of the image collection.

A component for image recognition in a collection of digital images is further provided including a training module for training image classifiers and a retrieval module for retrieving a sub-set of images from the collection.

The training module is preferably configured according to the following: For each image in the collection, any regions are identified in the image that correspond to a face. For each face region and any associated peripheral region, feature vectors are determined for each of the image classifiers. The feature vectors are stored in association with data relating to the associated face region.

The retrieval module is preferably configured according to the following: At least one reference region including a face to be recognized is/are selected from an image. At least one image classifier is/are selected on which the retrieval is to be based. A respective feature vector is determined for each selected classifier of the reference region. A sub-set of images is selected from within the image collection in accordance with the distance between the feature vectors determined for the reference region and the feature vectors for face regions of the image collection.

In a further aspect there is provided a corresponding component for image recognition.

In the embodiment, the training process cycles automatically through each image in an image collection, employing a face detector to determine the location of face regions within an image. It then extracts and normalizes these regions and associated non-face peripheral regions which are indicative of, for example, the hair, clothing and/or pose of the person associated with the determined face region(s). Initial training data is used to determine a basis vector set for each face classifier.

A basis vector set comprises a selected set of attributes and reference values for these attributes for a particular classifier. For example, for a DCT classifier, a basis vector could comprise a selected set of frequencies by which selected image regions are best characterised for future matching and/or discrimination and a reference value for each frequency. For other classifiers, the reference value can simply be the origin (zero value) within a vector space.

Next for each determined, extracted and normalized face region at least one feature vector is generated for at least one face-region based classifier and where an associated non-face region is available, at least one further feature vector is generated for a respective non-face region based classifier.

A feature vector can be thought of as an identified region's coordinates within the basis vector space relative to the reference value.

These data are then associated with the relevant image and face/peripheral region and are stored for future reference.

In the embodiment, image retrieval may either employ a user selected face region or may automatically determine and select face regions in a newly acquired image for comparing with other face regions within the selected image collection. Once at least one face region has been selected, the retrieval process determines (or if the image was previously "trained", loads) feature vectors associated with at least one face-based classifier and at least one non-face based classifier. A comparison between the selected face region and all other face regions in the current image collection will next yield a set of distance measures for each classifier. Further, while calculating this set of distance measures, mean and variance values associated with the statistical distribution of the distance measures for each classifier are calculated. Finally these distance measures are preferably normalized using the mean and variance data for each classifier and are summed to provide a combined distance measure which is used to generate a final ranked similarity list.

In the preferred embodiment, the classifiers include a combination of wavelet domain PCA (principle component analysis) classifier and 2D-DCT (discrete cosine transform) classifier for recognising face regions.

These classifiers do not require a training stage for each new image that is added to an image collection. For example, techniques such as ICA (independent component analysis) or the Fisher Face technique which employs LDA (linear discriminant analysis) are well known face recognition techniques which adjust the basis vectors during a training stage to cluster similar images and optimize the separation of these clusters.

The combination of these classifiers is robust to different changes in face poses, illumination, face expression and image quality and focus (sharpness).

PCA (principle component analysis) is also known as the eigenface method. A summary of conventional techniques that utilize this method is found in *Eigenfaces for Recognition*, Journal of Cognitive Neuroscience, 3(1), 1991 to Turk et al., which is hereby incorporated by reference. This method is sensitive to facial expression, small degrees of rotation and different illuminations. In the preferred embodiment, high frequency components from the image that are responsible for slight changes in face appearance are filtered. Features obtained from low pass filtered sub-bands from the wavelet decomposition are significantly more robust to facial expression, small degrees of rotation and different illuminations than conventional PCA.

In general, the steps involved in implementing the PCA/Wavelet technique include: (i) the extracted, normalized face region is transformed into gray scale; (ii) wavelet decomposition in applied using Daubechie wavelets; (iii) histogram equalization is performed on the grayscale LL sub-band representation; next, (iv) the mean LL sub-band is calculated and subtracted from all faces and (v) the 1st level LL sub-band is used for calculating the covariance matrix and the principal components (eigenvectors). The resulting eigenvectors (basis vector set) and the mean face are stored in a file after training so they can be used in determining the principal components for the feature vectors for detected face regions. Alternative embodiments may be discerned from the discussion in H. Lai, P. C. Yuen, and G. C. Feng, "Face recognition using holistic Fourier invariant features" Pattern Recognition, vol. 34, pp. 95-109, 2001, which is hereby incorporated by reference.

In the 2D Discrete Cosine Transform classifier, the spectrum for the DCT transform of the face region can be further processed to obtain more robustness (see also, *Application of the DCT Energy Histogram for Face Recognition*, in Proceedings of the 2nd International Conference on Information Technology for Application (ICITA 2004) to Tjahyadi et al., hereby incorporated by reference).

The steps involved in this technique are generally as follows: (i) the resized face is transformed to an indexed image using a 256 color gif colormap; (ii) the 2D DCT transform is applied; (iii) the resulting spectrum is used for classification; (iv) for comparing similarity between DCT spectra the Euclidian distance was used.

Examples of non-face based classifiers are based on color histogram, color moment, colour correlogram, banded colour correlogram, and wavelet texture analysis techniques. An implementaton of color histogram is described in "CBIR method based on color-spatial feature," *IEEE Region 10th Ann. Int. Conf.* 1999 (*TENCON'99*, Cheju, Korea, 1999). Use of the colour histogram is, however, typically restricted to classification based on the color information contained within a sub-regions of the image.

Color moment may be used to avoid the quantization effects which are found when using the color histogram as a classifier (see also "Similarity of color images," *SPIE Proc.* pp. 2420 (1995) to Stricker et al, hereby incorporated by reference). The first three moments (mean, standard deviation and skews) are extracted from the three color channels and therefore form a 9-dimensional feature vector.

The colour auto-correlogram (see, U.S. Pat. No. 6,246,790 to Huang et al, hereby incorporated by reference) provides an image analysis technique that is based on a three-dimensional table indexed by color and distance between pixels which expresses how the spatial correlation of color changes with distance in a stored image. The color correlogram may be used to distinguish an image from other images in a database. It is effective in combining the color and texture features together in a single classifier (see also, "Image indexing using color correlograms," In *IEEE Conf. Computer Vision and Pattern Recognition*, PP. 762 et seq (1997) to Huang et al., hereby incorporated by reference).

In the preferred embodiment, the color correlogram is implemented by transforming the image from RGB color space, and reducing the image colour map using dithering techniques based on minimum variance quantization. Variations and alternative embodiments may be discerned from *Variance based color image quantization for frame buffer display," Color Res. Applicat.*, vol. 15, no. 1, pp. 52-58, 1990 to by Wan et al., which is hereby incorporated by reference. Reduced colour maps of 16, 64, 256 colors are achievable. For 16 colors the vga colormap may be used and for 64 and 256 colors, a gif colormap may be used. A maximum distance set D=1; 3; 5; 7 may be used for computing auto-correlogram to build a N×D dimension feature vector where N is the number of colors and D is the maximum distance.

The color autocorrelogram and banded correlogram may be calculated using a fast algorithm (see, e.g., "Image Indexing Using Color Correlograms" from the Proceedings of the 1997 Conference on Computer Vision and Pattern Recognition (CVPR '97) to Huang et al., hereby incorporated by reference).

Wavelet texture analysis techniques (see, e.g., "Texture analysis and classification with tree-structured wavelet transform," *IEEE Trans. Image Processing* 2(4), 429 (1993) to Chang et al., hereby incorporated by reference) may also be advantageously used. In order to extract the wavelet based texture, the original image is decomposed into 10 de-correlated sub-bands through 3-level wavelet transform. In each subband, the standard deviation of the wavelet coeficients is extracted, resulting in a 10-dimensional feature vector.

BRIEF DESCRIPTION OF THE DRAWINGS

Statement Regarding Color Drawings

The patent or application file contains at least one drawing executed in color. Copies of this patent or patent application publication with color drawing(s) will be provided by the Office upon request and payment of the necessary fee.

Figure 7:
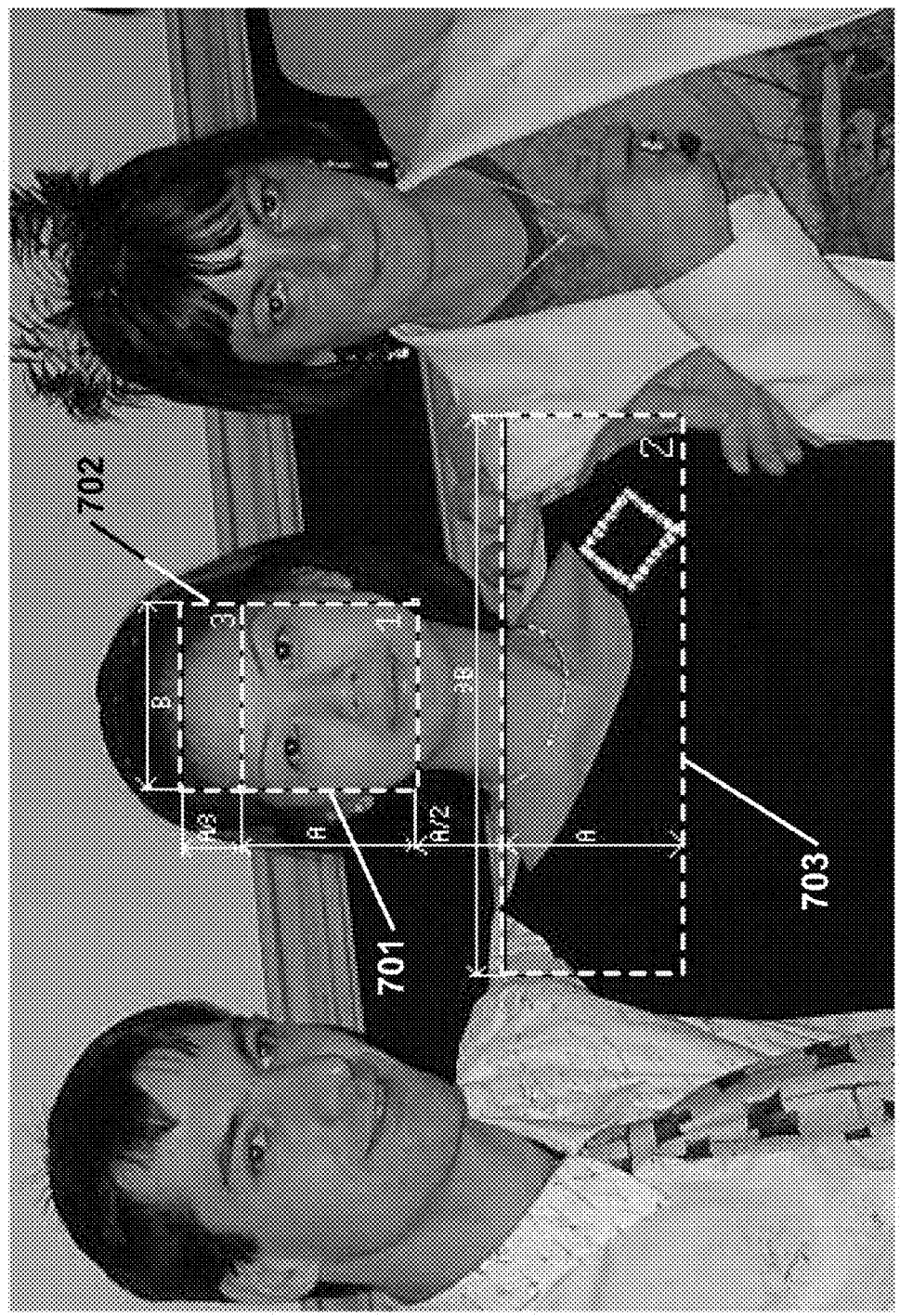
Figure 9:
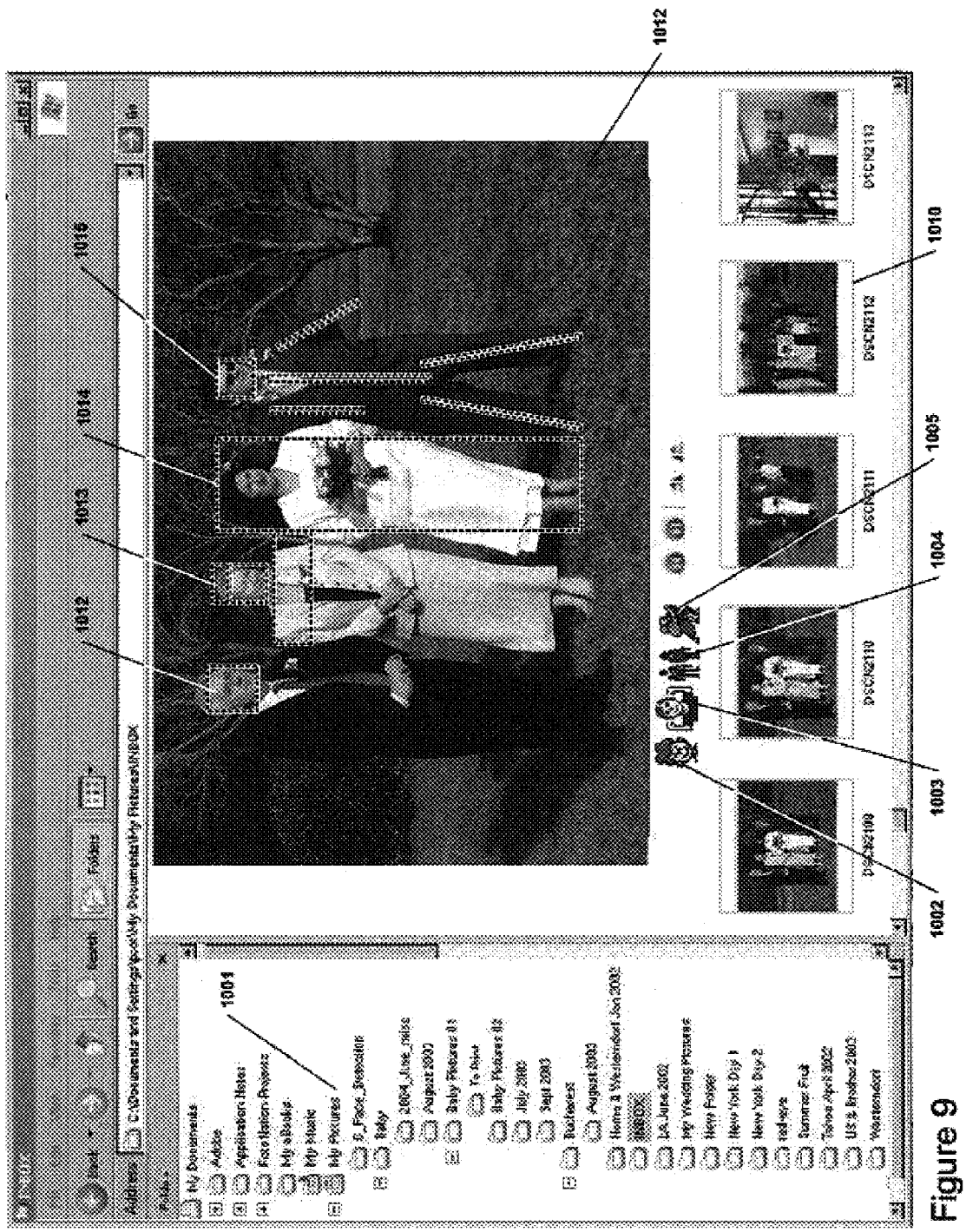

Embodiments of the invention will now be described, by way of example, with reference to the accompanying drawings, in which:

FIG. 1(*a*) is a block diagram of an image processing system according to a preferred embodiment of the present invention;

FIG. 1(*b*) illustrates the determining of a training method to be applied to an Image Collection by the training module of FIG. 1(*a*);

FIG. 1(*c*) illustrates an overview of the main retrieval process applied by the retrieval module of FIG. 1(*a*);

FIG. 2(*a*) illustrates the operation of main image analysis module of FIG. 1(*a*);

FIG. 2(*b*) illustrates the full training workflow which is implemented on an image collection;

FIG. 2(*c*) illustrates the incremental training workflow which allows image subsets to be integrated with a previously trained image collection;

FIG. 2(*d*) illustrates the operation of the training module for combining pre-trained image collections;

FIG. 3(*a*) illustrates additional details of main image sorting/retrieval workflow following from FIG. 1(*c*);

FIG. 4(*a*) illustrates an exemplary data storage structure for an image collection data set determined from the training process(s) illustrated in FIG. 2;

FIGS. 4(*b*) and 4(*c*) illustrate additional details of the image data records including information stored on the extracted face & peripheral regions of an image;

FIG. 4(*d*) illustrates the manner by which image collection data sets may be combined;

FIGS. 5(*a*) and (*c*) illustrate the principle aspects of an image classifier where the feature vectors for individual patterns can be determined relative to an "averaged" pattern (mean face) and where feature vectors for individual patterns are determined in absolute terms (colour correlogram) respectively;

FIGS. 5(*b*) and (*d*) illustrate the calculation of respective sets of similarity measure distances from a selected classifier pattern to all other classifier patterns within images of the Image Collection;

FIG. 5(*e*) illustrates how multiple classifiers can be normalized and their similarity measures combined to provide a single, similarity measure;

FIGS. 6(*a*), (*b*) & (*c*) illustrate statistical distribution patterns of the sets of similarity measures described in FIG. 5 for (a) Wavelet based PCA feature vectors; (b) DCT based feature vectors and (c) colour correlogram based feature vectors;

FIG. 7 illustrates a face region determined by a face detector module and the associated peripheral regions which are used for colour pattern matching of a person's hair and upper body clothing;

FIGS. 8(*a*), (*b*), (*c*) and (*d*) illustrate user interface aspects in accordance with a preferred embodiment;

FIG. 9 illustrates user interface aspects in accordance with a preferred embodiment.

Figure 10:
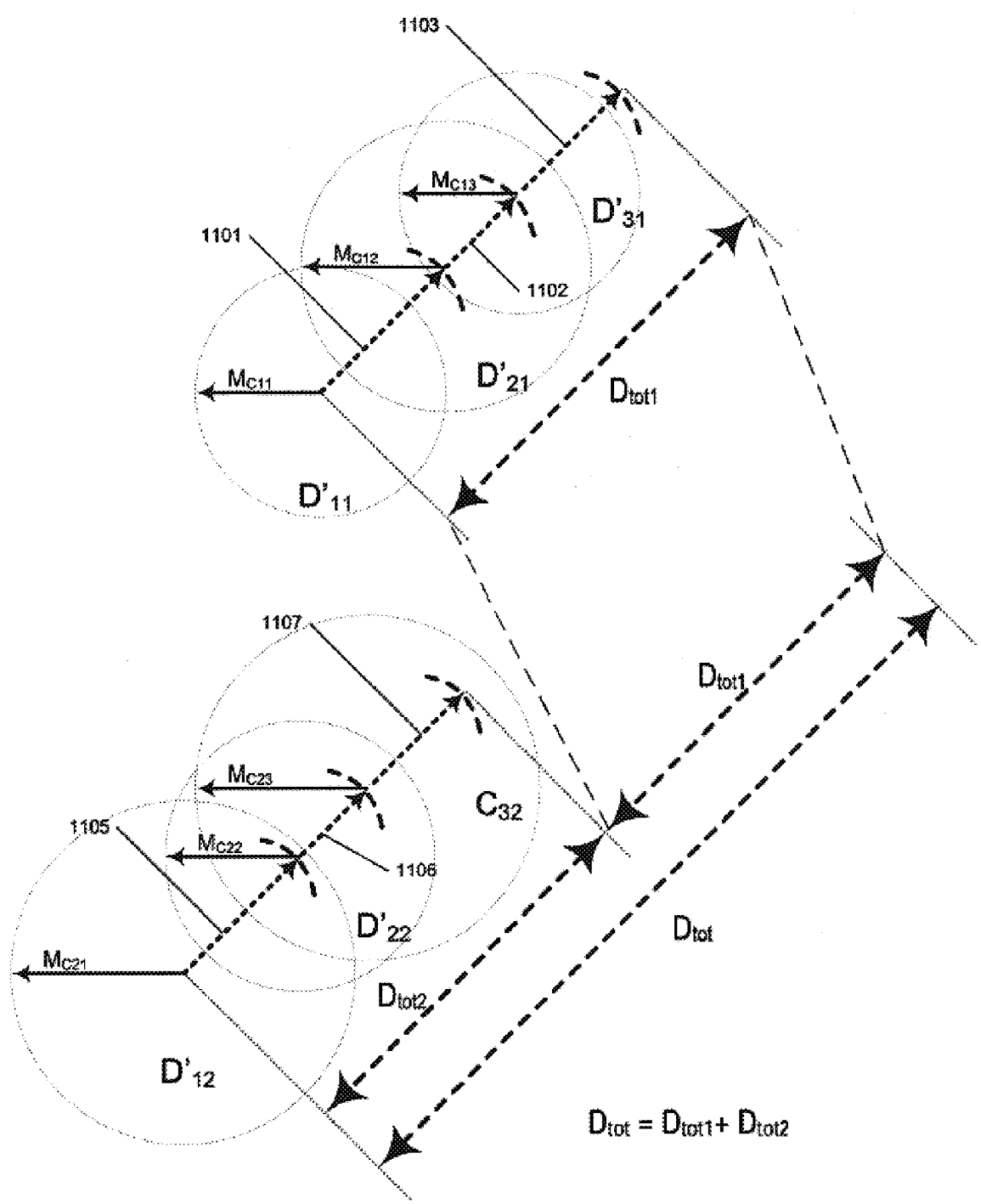

FIG. 10 illustrates the manner in which images are ranked according to their similarity to multiple reference regions.

Figure 11:
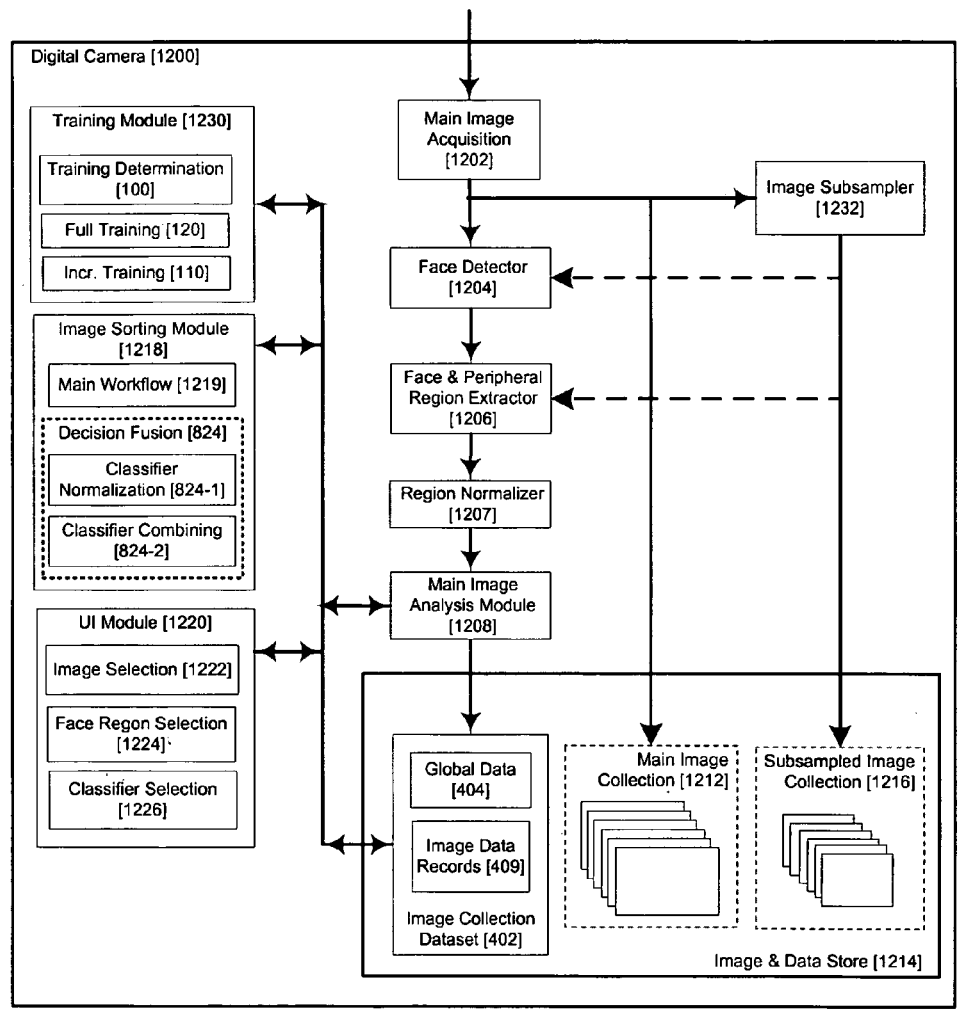

FIG. 11 is a block diagram of an in-camera image processing system according to an alternative embodiment.

DETAILED DESCRIPTION OF THE PREFERRED EMBODIMENT(s)

The main preferred embodiment of the present invention will be described in relation to FIG. 1(*a*). This takes the form of a set of software modules 162 implemented on a desktop computer 150.

A second preferred embodiment provides an implementation within an embedded imaging appliance such as a digital camera.

Main Embodiment

Software Modules on a Desktop Computer

In this principle embodiment, the present invention is described in the context of a desktop computer environment and may either be run as a stand-alone program, or alternatively may be integrated in existing applications or operating system (OS) system components to improve their functionality.

1. Main Image Analysis Module 156

This module cycles through a set of images 170-1 . . . 180-2 and determines, extracts, normalizes and analyzes face regions and associated peripheral regions to determine feature vectors for a plurality of face and non-face classifiers. The module then records this extracted information in an image data set record. The operation of the module is next described in FIG. 2(*a*). As will be explained later, components of this module are also used in both training and sorting/retrieval modes of the embodiment. The module is called from a higher level workflow and in its normal mode of usage is passed a set of images which must be analyzed [202]. The module loads/acquires the next image [204] and detects any face regions in said image [210]. If no face regions were found [212] then flags in the image data record for that image are updated to indicate that no face regions were found [280]. If the current image is not the last image in the image set being analyzed [298] the next image is loaded/acquired [204]. If this was the last image [298] then the module will exit [299] to the calling module. Where at least one face region is detected the module next extracts and normalizes each detected face region and, where possible, any associated peripheral regions [214].

Face region normalization techniques can range from a simple re-sizing of a face region to more sophisticated 2D rotational and affine transformation techniques and to highly sophisticated 3D face modeling methods.

FIG. 7 illustrates shows a determined face region [701], and its associated peripheral regions [702, 703]. The dimensions and relative locations of these regions are exemplary and may be adapted according to additional determining steps after the main face region is detected. Further, we remark that additional peripheral regions may be added to specifically identify items such as ear-rings, necklaces, scarves, ties and hats.

Both the face region and a full body region may also be employed for color/texture analysis and can be used as additional classifiers for the sorting/retrieval process (see also Chen et al in "Face annotation for family photo album management", published in the International Journal of Image and Graphics Vol. 3, No. 1 (2003), hereby incorporated by reference).

Other examples of associated peripheral regions are given in FIG. 9 and are described below.

Returning to FIG. 2(a), we next discuss the analyzing of a set of extracted, normalized regions associated with a detected face region. Essentially this is the process of determining feature vectors for a plurality of face and non-face image classifiers. In this embodiment, we have confined our analysis to two face-based classification techniques and one non-face means of classification based on the banded color correlogram. In fact many different combinations between these and alternative techniques may be used.

Figure 2A:
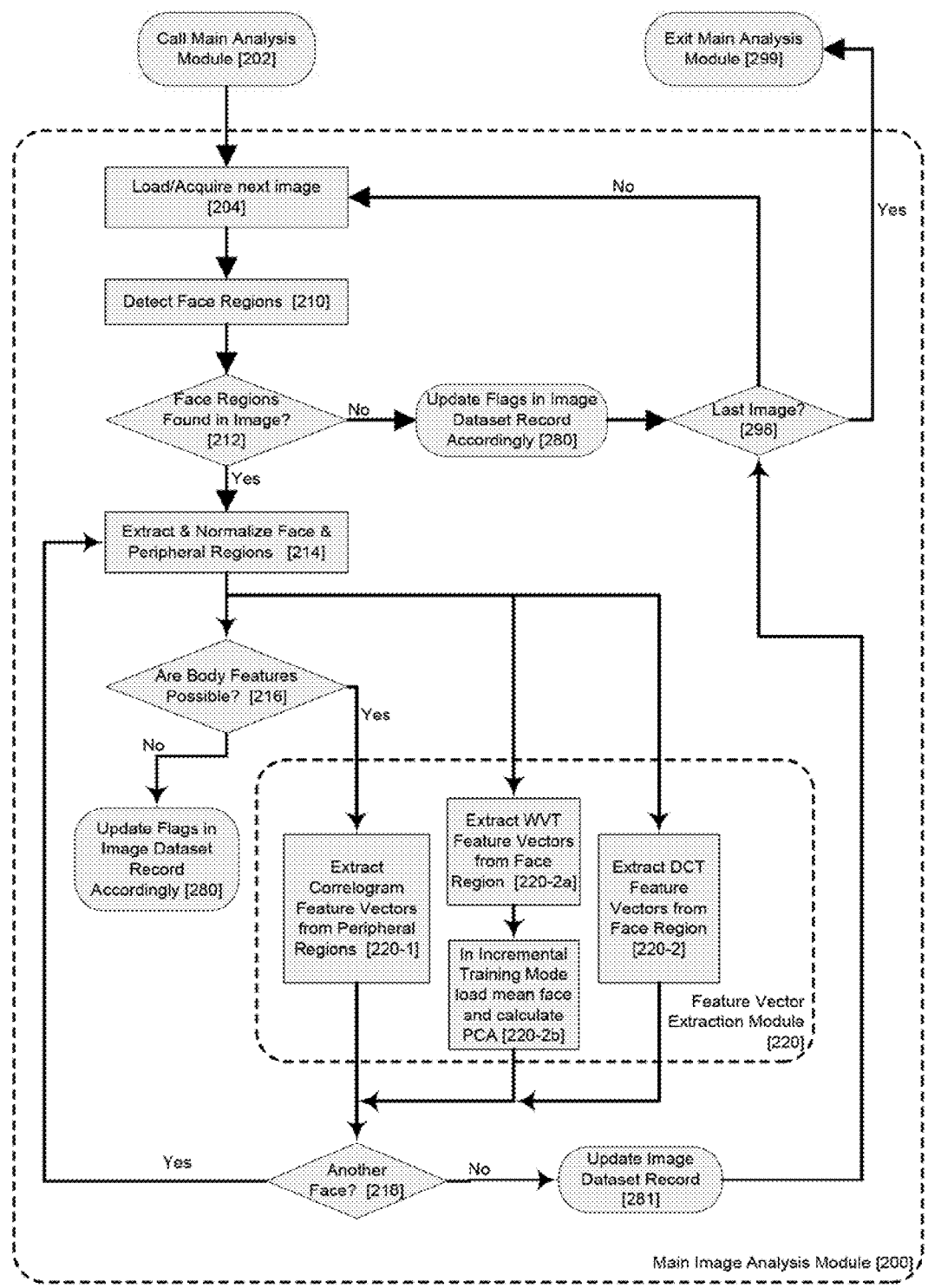

In FIG. 2(a) we illustrate this feature vector determination process [220] as a combination of three parallel processes [220-1, 220-1 and 220-3]. In a practical embodiment within a desktop computer, each feature extraction process will be performed in a sequential manner. However representing these processes in parallel indicates that (i) they are independent of one another and (ii) that alternative hardware-based embodiments of the present invention may advantageously perform these classification processes in parallel. Once the feature vectors for the present face region and associated peripheral regions have been determined they are retained in temporary memory storage and a determination if this is the last face region in the current image is made [218]. If other face regions remain then these must be extracted, normalized and analyzed in turn [214, 220]. When all face regions within an image have had their feature vectors extracted this data, together with additional information on the location of each face/peripheral region within the image are recorded in an image data record for the current image [281]. An exemplary description of such an image data record is given in FIG. 4(b) and will be described shortly. After updating of the current image data record the main image analysis module next determines if that was the last image [298] and, if this is the case, it exits [299]. If, however, additional images exist it continues to cycle through each in turn and creates/updates and image data record for each.

We also remark that if a face region is near the edge of an image it may not be possible to properly define peripheral regions such as the body region or the hair region [216]. In this case a flag is modified in the image data record to indicate this. During the sorting/retrieval process (described later), if the user selects a search method which includes body or hair regions than the faces without those regions are either not considered in the search or are given statistically determined maximal feature vector values for these regions during the classification process.

2. Image Collection Training Process

Before the modules 162 can perform their main function of image sorting and retrieval, it is first necessary to initiate a training process on an image collection. In this principle embodiment we will assume that an exemplary image collection is a set of images contained within a subdirectory of the file system on a desktop PC. Thus, when a process controlling the modules 162 is active and a user switches into a subdirectory containing images, the module 156 must load this new image collection and determine firstly if there are images which have not contributed to the training process and secondly if the number of such unutilized images warrants a full retraining of the image collection or if, alternatively, an incremental training process can be successfully employed.

Figure 1A:
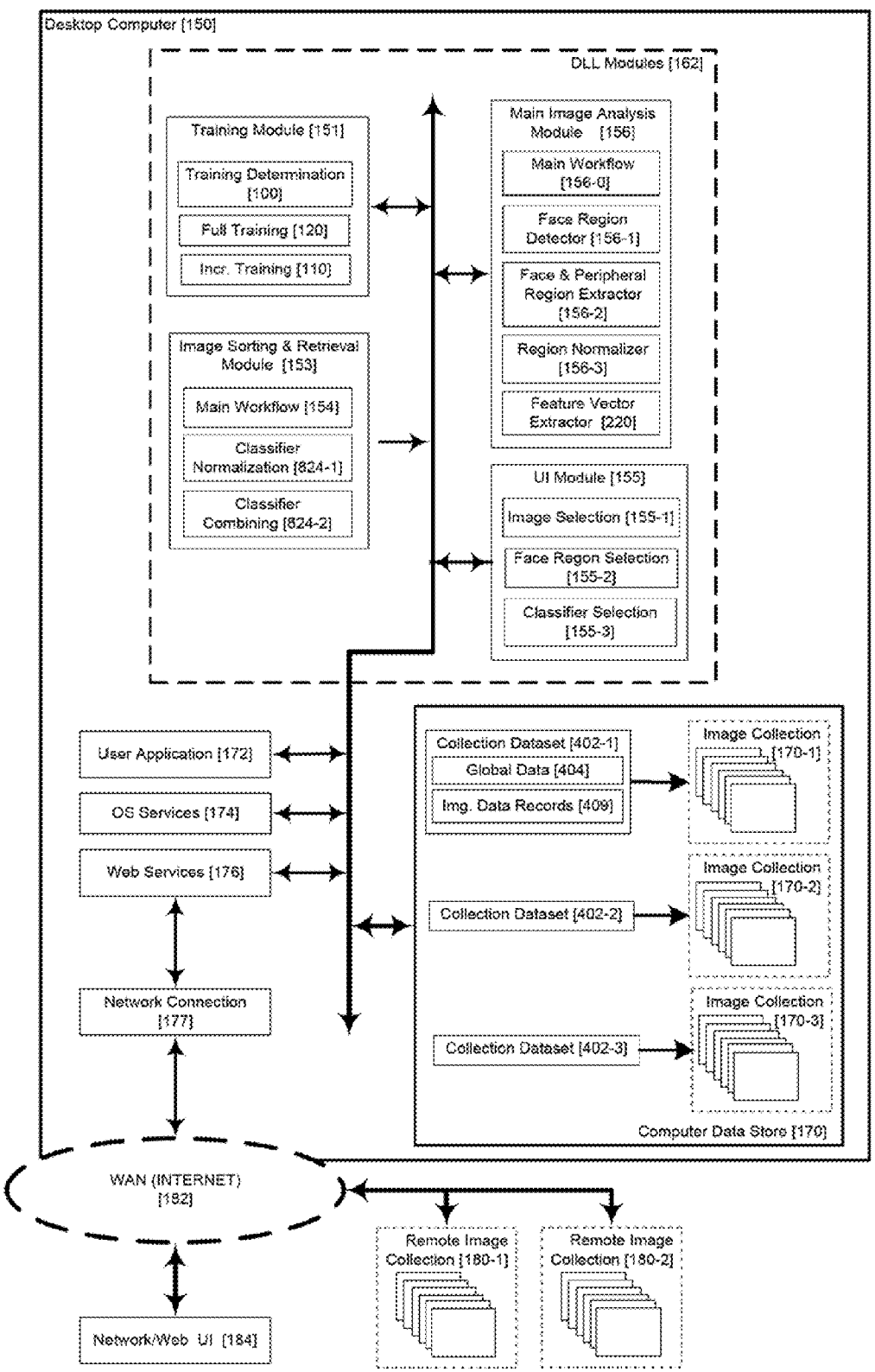
Figure 1B:
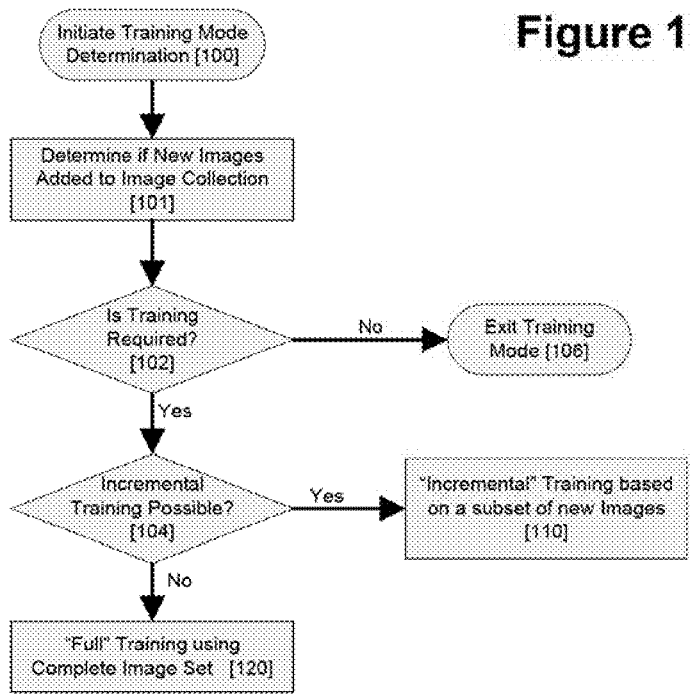

FIG. 1(b) illustrates this process of determining which training method (full, incremental or no training) is to be applied to an image collection; thus, in response to some external event [100] (examples include user input or switching to a file system directory containing images or a timed, periodic check of known image collections) the training mode determination process first checks if new, unutilized images have been added to the image collection since the last determination of training mode [101]. If now new images have been added, or the number of new images is less than a predetermined threshold value or percentage then no training is required and the training mode determination process may exit [106]. However, if enough unutilized new images have been added the next step is to determine if incremental training is possible [104]. This decision will depend partly on the nature of the classifiers used in the person recognition process, partly on the number of unutilized images and partly on the number of images and determined face regions in the previously trained image collection.

In this preferred embodiment all of the face and non-face recognition techniques employed can be combined linearly which allows incremental training even for quite large additional subsets of new images which are added to a previously trained main image collection. However the present invention does not preclude the use of alternative face or non-face recognition methods which may not support linear combination, or may only support such combinations over small incremental steps. If it is determined that incremental training is possible then the training mode determination step exits to the incremental training step [110] which is further described in FIG. 2(c). Alternatively, if there are too many new images, or the classifiers employed in the present invention are not susceptible to linear combination between image sets then a full retraining must be undertaken [120]. This step is further described in FIG. 2(b).

A system in accordance with a preferred embodiment represents an improvement over the system described at US published application number 2002/0136433 to Lin, which is hereby incorporated by references, and which describes an "adaptive facial recognition system". The approach described by Lin requires the determination of feature vectors based on a fixed set of basis vectors and a "generic" or "mean" face previously determined through offline training. The present invention allows for incremental retraining based on the automatic determination of face regions within newly acquired images or sets of such images.

A further improvement is that the facial regions determined and normalized by the module 156 are preferably re-utilized in subsequent re-training operations. As the automated determination of valid face regions within an image and the normalization of such regions is the most time-consuming part of the training process—typically representing 90-95% of the time required for training a typical image collection—this means that subsequent combining of several image collections into a "super-collection" and re-training of this "super-collection" can be achieved with a substantially reduced time lag.

2.1 Full Training Mode Workflow

Figure 2B:
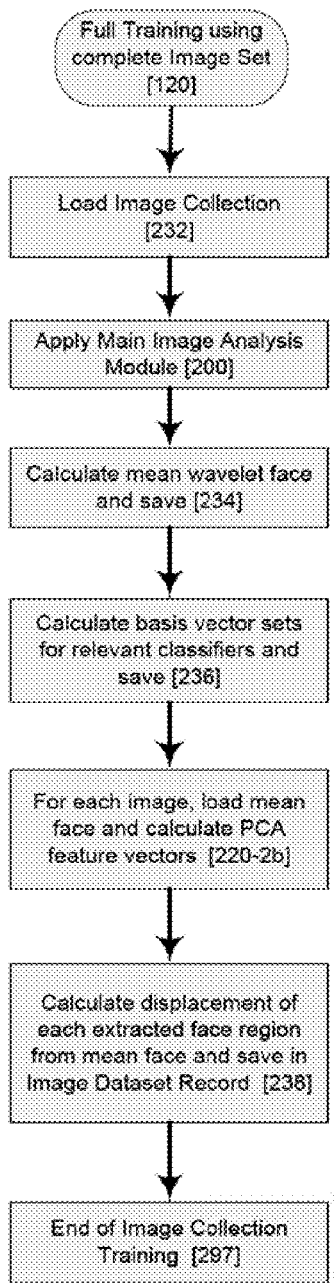

FIG. 2(b) illustrates the full training workflow which is implemented on an image collection; this module is initiated from the training mode determination module [100] described in FIG. 1(a). Once it is determined that an entire image collection must be trained, the next step is to load a set of data/memory pointers or file handles which will allow all of the individual images of a collection to be accessed as required [232]. Next the main image analysis module is called with the full image collection as an input [200].

In full training mode, it may not be as easy to complete all steps in the feature vector extraction process [220] in the main image analysis module [200], because the relevant basis vector may not yet be determined. In the preferred embodiment, the Wavelet/PCA classifier method [220-2b] is less easily completed until all images have been analyzed. A couple of alternatives are as follows. First, the main image analysis module may be called a second time to repeat these steps [220-2b] which may not have been completed on the first pass. Second, the incomplete feature vector extraction steps may be performed externally to the main image analysis module.

The latter case has been illustrated in FIG. 2(b). Thus, after applying the main image analysis module [200] the mean wavelet face can be calculated [234] and the PCA basis vector set can subsequently be determined [236]. Following these operations it is now possible to explicitly complete the extraction of the feature vectors for the PCA/Wavelet method of face recognition [220-2b], or alternatively to call the main image analysis module a second time, with input flags set to skip most of the internal processing steps apart from [220-2b]. As both the colour correlogram and DCT face recognition techniques chosen for the preferred embodiments use predetermined basis vectors, the feature vectors associated with these classifiers can always be calculated within the main image analysis module. Finally, having determined the feature vectors for PCA we next use these to calculate the vector displacement, in PCA classifier space, of each extracted face region relative to the mean face [236-1]. This "relative" set of feature vectors is then added to the relevant image data record [236-2]. Finally we exit the full training module [297], returning to the calling module.

2.2 Incremental Training Mode Workflow

Figure 2C:
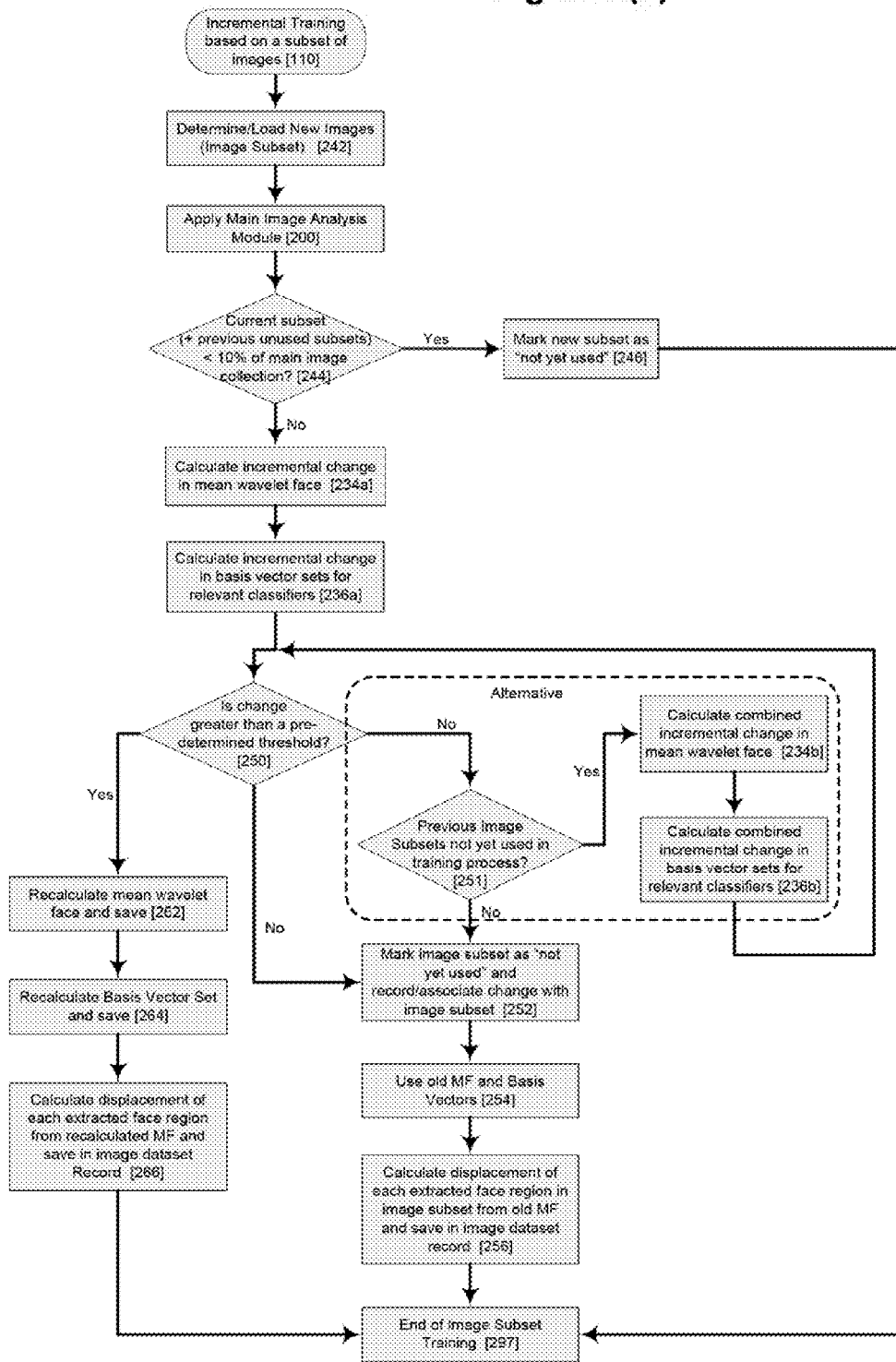

Normally an image collection will only need to go through this (automated) full training procedure once. After initial training, it will normally be possible to add and analyze new images using the determined basis vector set for the classifier, for example, PCA. When a larger subset of new images is added to a collection, in the case of PCA/Wavelet face recognition classifiers, it will generally be possible to incrementally modify existing basis vectors by only training the newly added image subset and subsequently modifying the existing location of the mean face and the previously determined basis vector set. FIG. 2(c) describes this process in detail illustrating the incremental training workflow which allows image subsets to be integrated with a previously trained image collection. This is the normal mode of image collection training.

It begins by a determination from the workflow of FIG. 1(b) which initiates the incremental training mode [110]. Next a set of data/memory pointers or file handles which will allow all of the individual images of the image subset to be accessed [232] is loaded. Alternatively, within an image acquisition device at least one newly acquired image may be loaded. The main image analysis module [200] is now applied to the loaded image subset, using the existing basis vectors for extracting feature vectors for each classifier. After the main image analysis module [200] has finished, the incremental change in the mean wavelet face and the PCA basis vector set for the combined image collection (original collection+new subset collection) can now be estimated [234a, 236a].

Note that if the size of the new image subset (plus any previous subsets which were unused for training (and marked accordingly)) is small relative to the size of the main image collection (say <10%) then these steps may optionally be deferred [244] and the images in the image subset are temporarily marked as "unused for training" [246]. Subsequently when a larger set of images is available, the incremental training module will take all of these images marked as "unused for training" and perform incremental training using a larger combined image superset. In that case the next step is to calculate the incremental change in the previously determined mean face location which will be produced by combining the new image (super)set with the previously determined training data [234a]. Once the new mean face location is determined, the incremental changes in the basis vector set for this classifier should next be determined [236a].

Figure 5A:
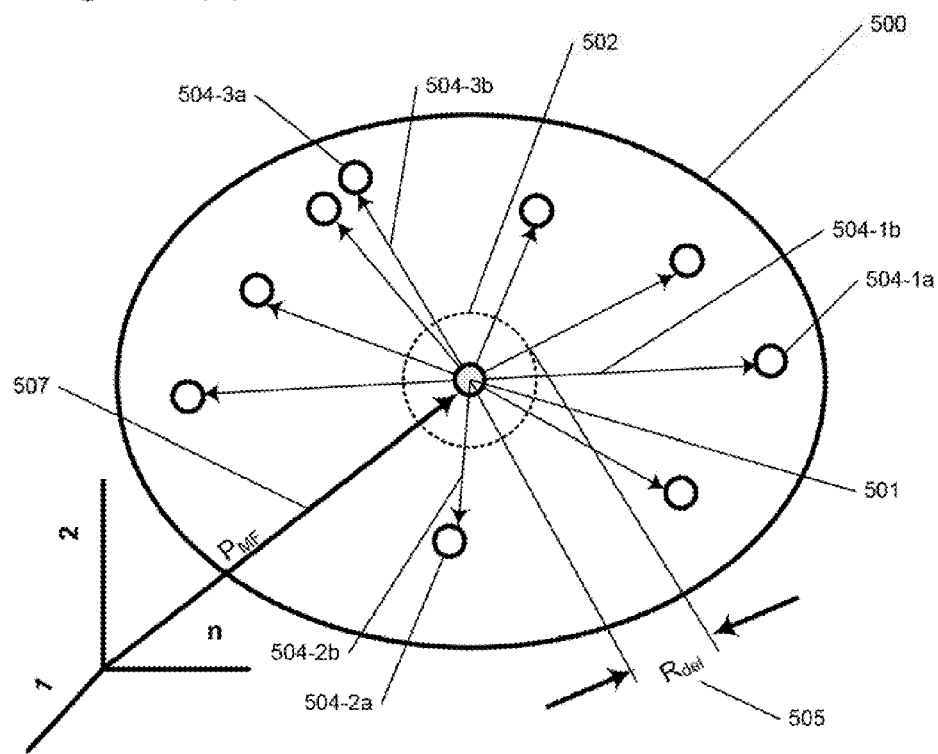

If either incremental change is greater than a predetermined threshold [250] and further illustrated [502, 505] in FIG. 5(a), then the mean wavelet face must be recalculated [262]. The relevant basis vectors must be also be recalculated [264] and finally the actual feature vectors for each affected classifier must be recalculated for all the determined face regions in each image [266]. We remark that if the classifiers are chosen, as they are in our preferred embodiment, so that the superposition theorem (linear combination) applies to the classifier space from which a feature vector describing a pattern is derived, then it is a simple matter to incrementally adjust the feature vectors for each image without a need to call the main image analysis module. (Note that if it were necessary to call the main image analysis module this would, in turn, require that each image is reloaded and the necessary face & peripheral regions are extracted, normalized and analyzed.) After steps [262], [264] and [266] are completed the incremental training module can now exit, returning to the calling module [297].

If these incremental changes are less than their predetermined thresholds, then the effects of completing incremental training will be minimal and it does not make sense to do so. In this case the current subset is marked as "unused for training" and the determined incremental changes are also recorded in the global collection data set [252], which is further described in FIG. 4(a). In this case the old mean face and basis vectors are retained [254] and are next used to calculate the feature vectors relative to the old mean face [256]. The incremental training module can now exit, returning to the calling module [297].

In a variation on the above workflow the determining of step [244] can be limited to the current subset (i.e. no account is taken of additional subsets which were not yet used in training) and the additional set of steps marked "alternative" can be used. In this case, if the incremental change determined from the current subset is below the predetermined threshold, then the workflow moves to block [251] which determines if additional unused image subsets are available. If this is not the case the workflow continues as before, moving to step [252]. However, when additional subsets are available these are combined with the current image subset and the combined incremental change in mean face is determined [234b] followed by a determination of the combined incremental change in the basis vector set for this classifier [236b]. The workflow next returns to the determining step [250], repeating the previous analysis for the combined image superset comprising the current image subset and any previously unused image subsets. In this manner the incremental training module can reduce the need for retraining except when it will significantly affect the recognition process.

In other embodiments, it may be desirable to combine previously trained image collections into a "super-collection" comprising of at least two such collections. In this case it is desirable to re-use image collection data which is fixed, i.e. data which is not dependent on the actual set of images. In particular this includes the determined locations of face/peripheral regions within each image and the normalization data pertaining to each such predetermined face/peripheral region. The determination and normalization of such regions is, typically, very time consuming for a consumer image collection taking 90-95% of the time required by the training process. For a collection of several hundred images, with an average size of 3 megapixels, this can take of the order of tens of minutes, whereas the time required by the actual training engines which extract classifier data from the determined face regions will normally require of the order of several seconds per training engine.

In particular, this makes a system in accordance with a preferred embodiment suitable for use with interactive imaging browsing software which in turn employs the modules 162. Through a user interface, the user selects different groups of images, for example, through interaction with a folder structure, either by selecting one or more folders, each containing images or selecting groups of images within a folder. As these images will have been incrementally added to the storage source (local 170 or remote 180) which the user is accessing, it is likely that face and non-face region information will already have been detected and determined by the module 156 or another copy running remotely. The user can select candidate region within an image and then selectively determine which types of classifiers are to be used for sorting and retrieving images from the selected groups of images. Then generating either basis vector and/or feature vector information for all images within the selected group of images as well as the candidate region prior to sorting/retrieval can be performed relatively quickly and in line with user response expectations of an interactive application.

Figure 2D:
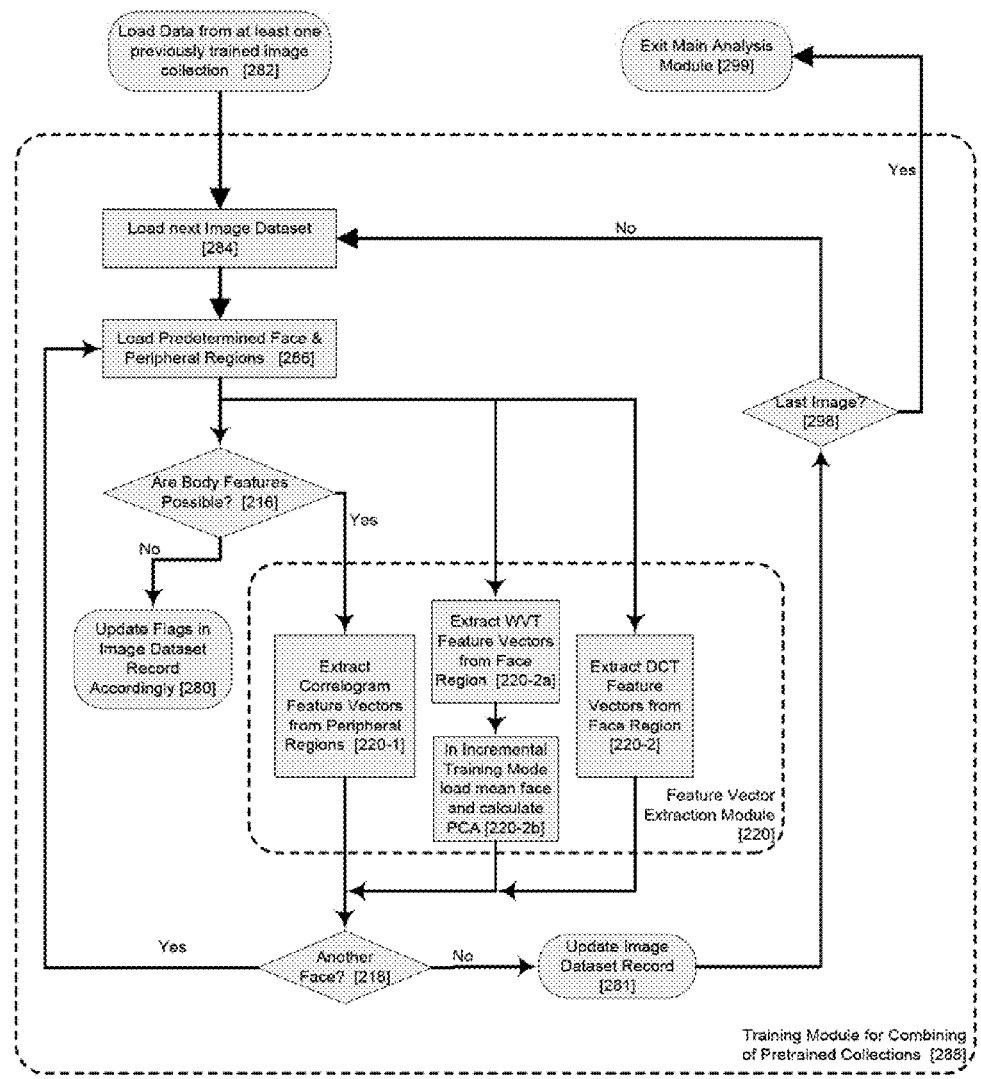
Figure 4A:
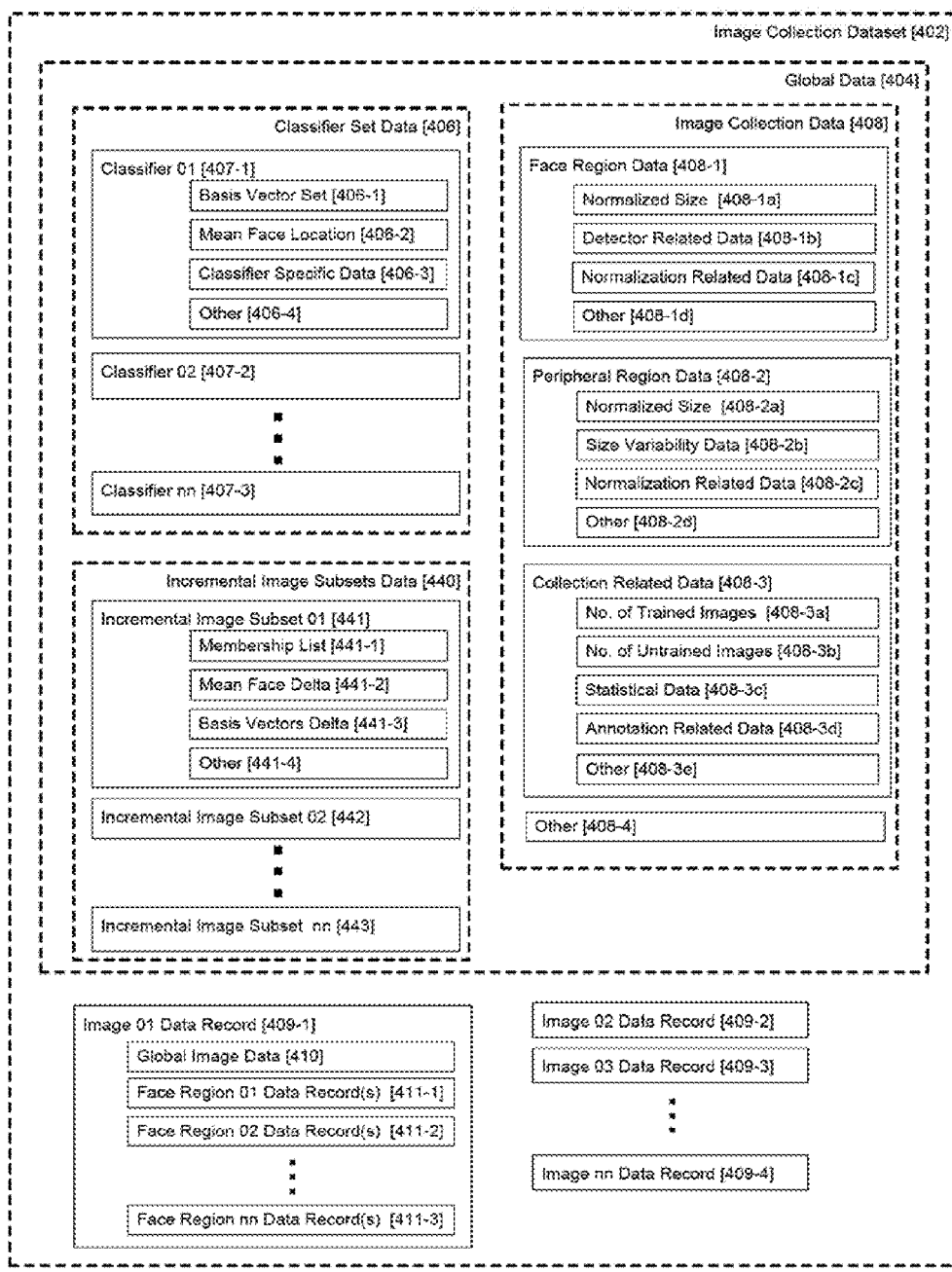
Figure 4B:
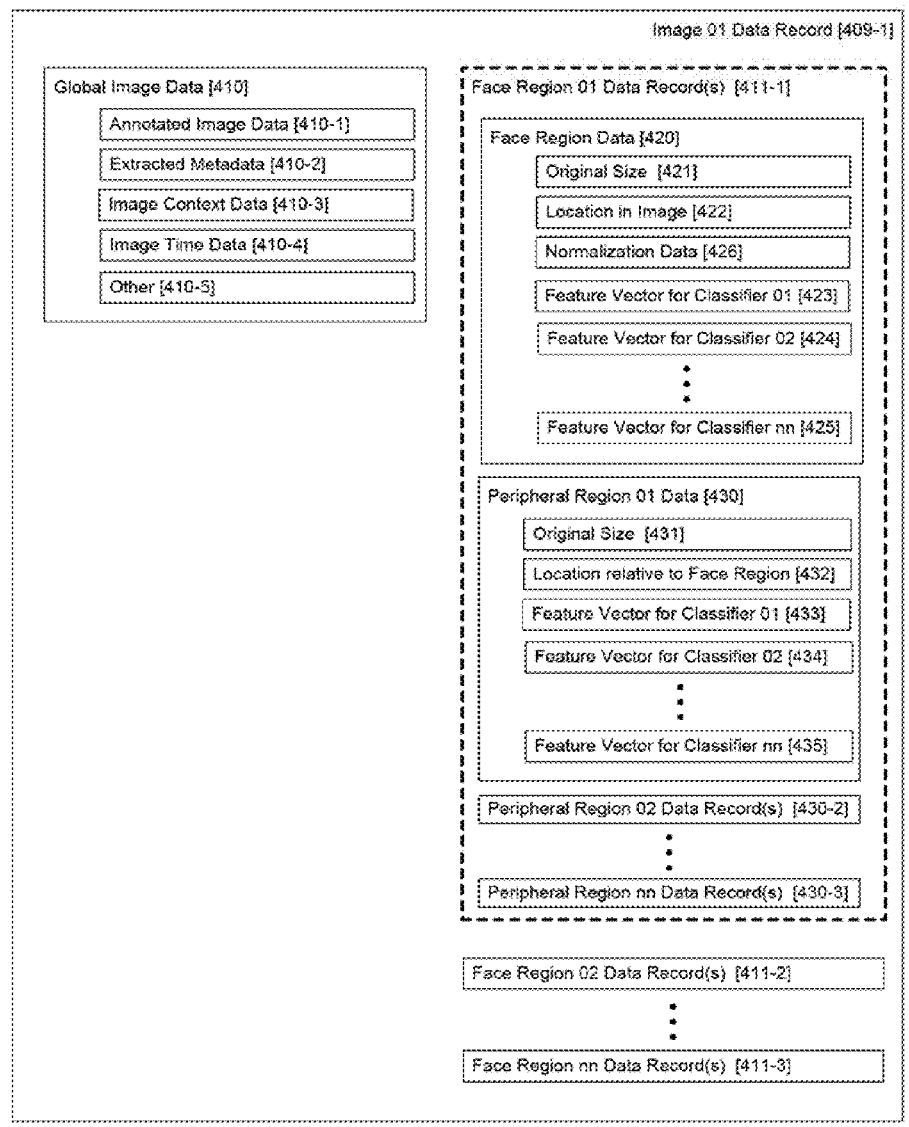

A modified variant of the main image analysis module [286], suitable for use in such an embodiment is illustrated in FIG. 2(d). In this variant the face region detection step and the subsequent normalization step are omitted. Instead at least one image collection data set is loaded [282]—this process could also be used for re-training an image collection which has been added to incrementally and has gradually grown large enough to require retraining. Then each image data record, as illustrated in FIG. 4(b) is loaded in turn [284] and the previously determined face and peripheral regions are read from this loaded image data record [286].

The remainder of the analysis process is similar to that described in the main image analysis module of FIG. 2(a) and comprises the extraction of feature vectors determined by each of the classifier engines.

3. Image Sorting and Retrieval

Now that the training process for an image collection has been described we must now consider how the image sorting/retrieval module functions.

3.1. Image Selection Process

Figure 1C:
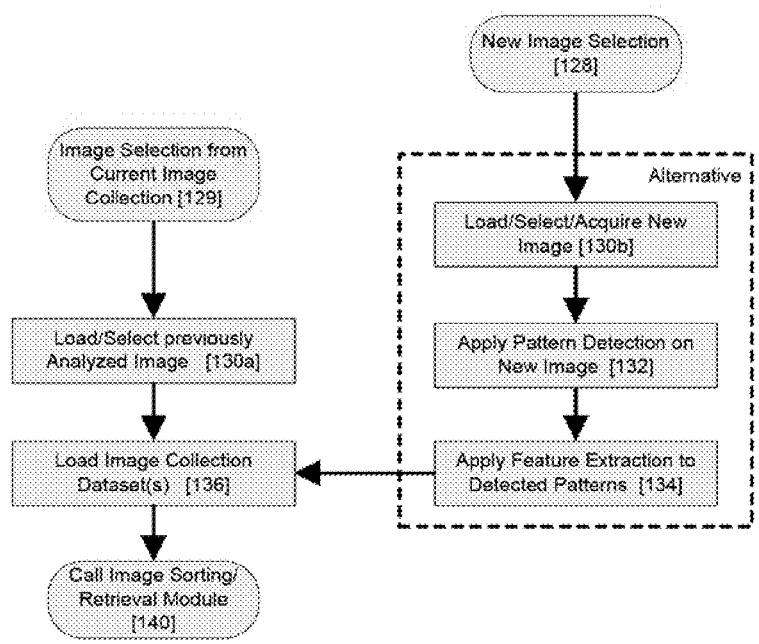

FIG. 1(c) illustrates an overview of the image selection process which should occur before the image sorting/retrieval process. A selected image will either be a newly selected/acquired image [128], in which case it must be loaded, selected or acquired [130b] and then subjected to face (pattern) detection [132]. This is followed by a feature vector extraction process [134] which may additionally incorporate related peripheral region extraction and region normalization steps. The extracted feature vector will be used for comparing with pre-determined feature vectors obtained from an image collection data set [138]. Alternatively, if an image is a member of an existing image collection [129], then the relevant feature vectors will have been previously extracted and it is only necessary to load the previously acquired image [130a] and the appropriate image data record and image collection data set [136]. The image sorting/retrieval module [140] may now be called.

3.2 Main Image Sorting/Retrieval Process

Figure 3A:
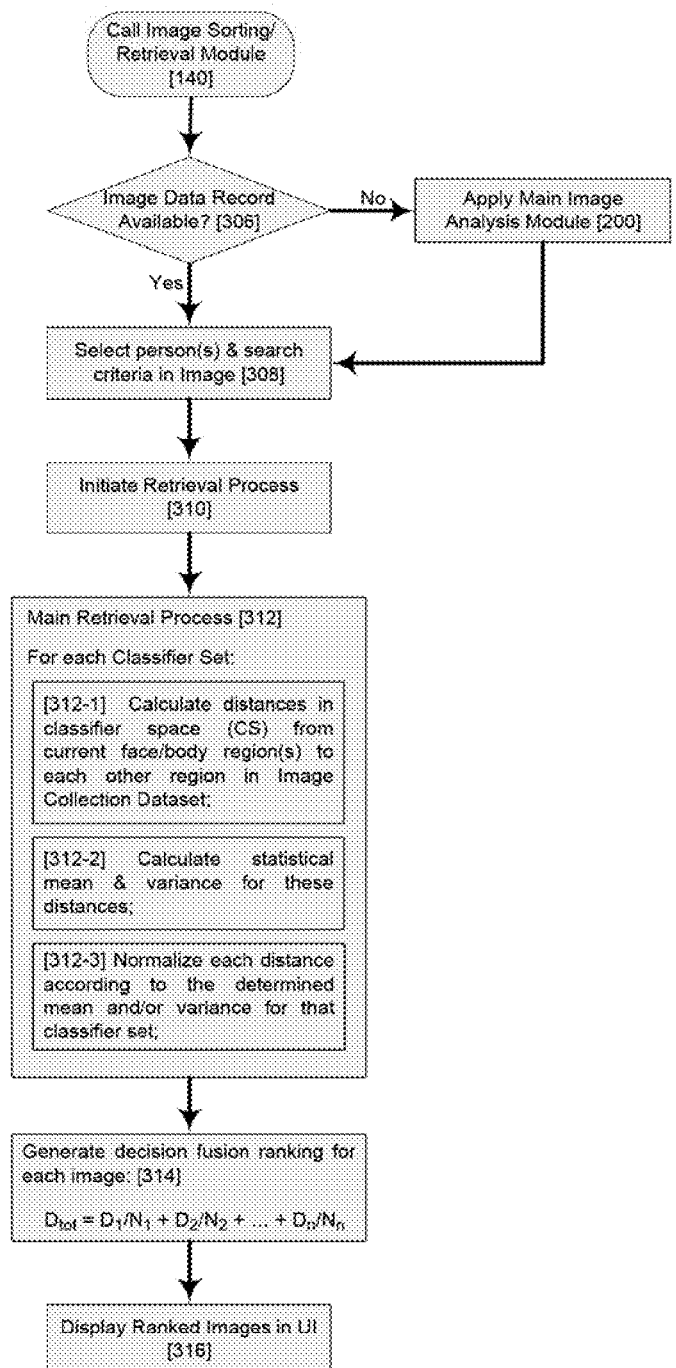

The workflow for this module is described in FIG. 3(a) and is initiated from the image selection or acquisition process described in FIG. 1(c) as the final process step [140]. It is assumed that when the image sorting/retrieval module is activated [140] it will also be provided with at least two input parameters providing access to (i) the image to be used for determining the search/sort/classification criteria, and (ii) the image collection data set against which the search is to be performed. If a data record has not already been determined for the search image [308] the main image analysis module is next applied to it to generate this data record [200]. The image is next displayed to a user who must make certain selections of the face regions to be used for searching and also of the classifiers to be used in the search [308]. Alternatively, the search criteria may be predetermined through a configuration file and step [308] may thus be automatic. The user interface aspects of the preferred embodiment are illustrated in FIGS. 8 & 9 and will be discussed shortly.

After a reference region comprising the face and/or peripheral regions to be used in the retrieval process is selected (or determined automatically) the main retrieval process is initiated [310] either by user interaction or automatically in the case where search criteria are determined automatically from a configuration file. The main retrieval process is described in step [312] and comprises three main sub-processes which are iteratively performed for each classifier to be used in the sorting/retrieval process:

(i) Distances are calculated in the current classifier space between the feature vector for the reference region and corresponding feature vector(s) for the face/peripheral regions for all images in the image collection to be searched [312-1]. In the preferred embodiment, the Euclidean distance is used to calculate these distances which serve as a measure of similarity between the reference region and face/peripheral regions in the image collection.

(ii) The statistical mean and standard deviation of the distribution of these calculated distances is determined and stored temporarily [312-2].

(iii) The determined distances between the reference region and the face/peripheral regions in the image collection are next normalized [312-3] using the mean and standard deviation determined in step [312-2].

These normalized data sets may now be combined in a decision fusion process [314] which generates a ranked output list of images. These may then be displayed by a UI module [316].

An additional perspective on the process steps [312-1, 312-2 and 312-3] is given in FIG. 5. FIG. 5(a) illustrates the classifier space [500] for a classifier such as the Wavelet/PCA face recognition used in this preferred embodiment. The basis vector set, $[\lambda_1, \lambda_2 \ldots, \lambda_n]$ is used to determine feature vectors for this classifier. The average or mean face is calculated [501] during the training phase and its vector position [507] in classifier space [500] is subtracted from the absolute position of all face regions. Thus, exemplary face regions [504-1a, 504-2a and 504-3a] have their positions [504-1b, 504-2b and 504-3b] in classifier space defined in vector terms relative to the mean face [501].

Figure 5B:
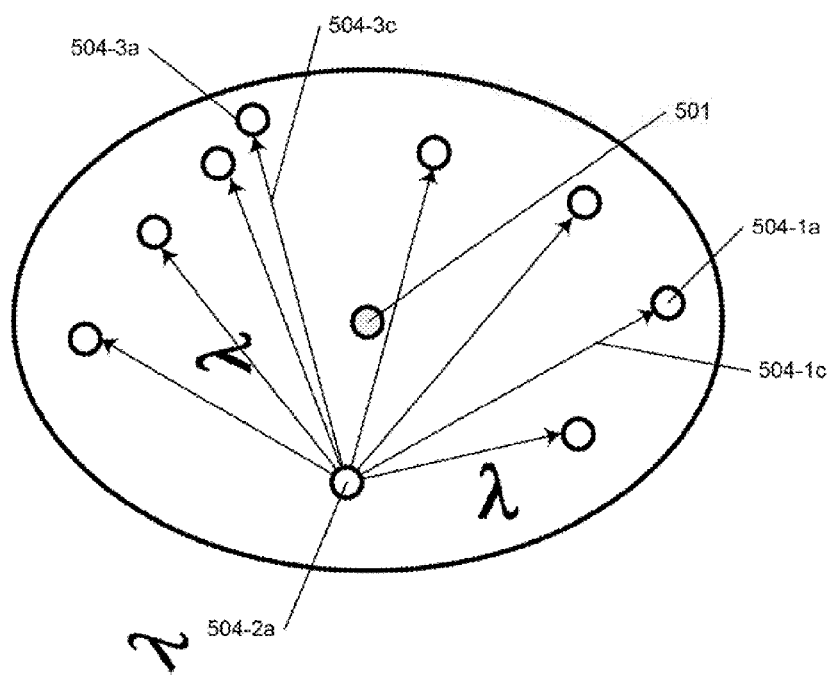

The result of performing step [312-1] on the classifier space of FIG. 5(a) is illustrated in FIG. 5(b). Thus, after a particular face region [504-2a] is selected by the user [308] the distances to all other face regions within a particular image collection are calculated. The face regions [504-1a] and [504-3a] are shown as illustrative examples. The associated distances (or unnormalized rankings) are given as [504-1c] and [504-3c].

Figure 5C:
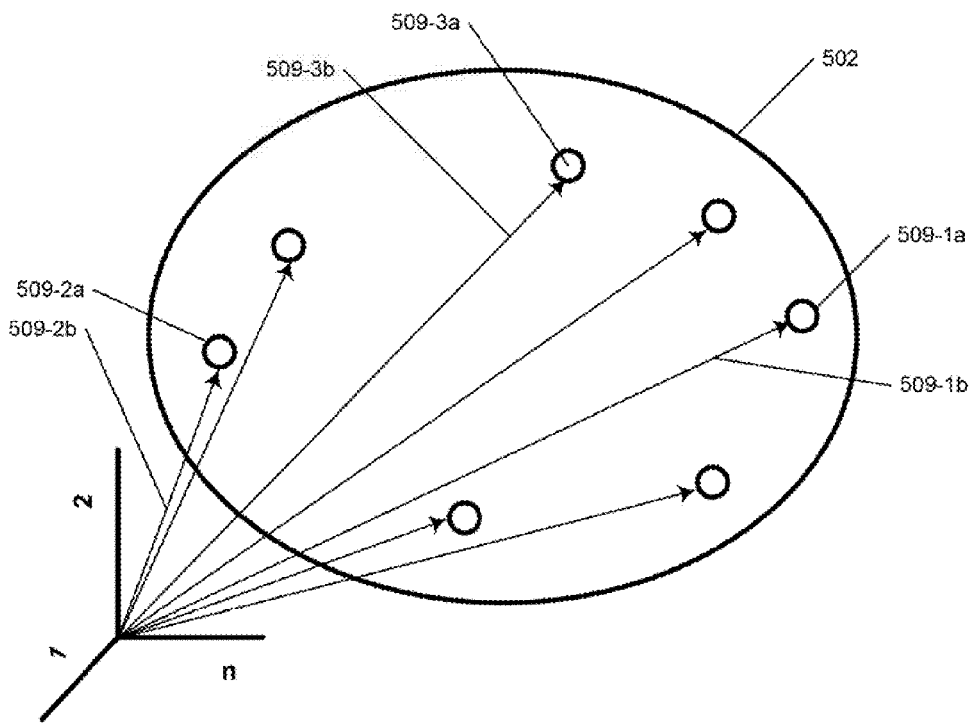
Figure 5D:
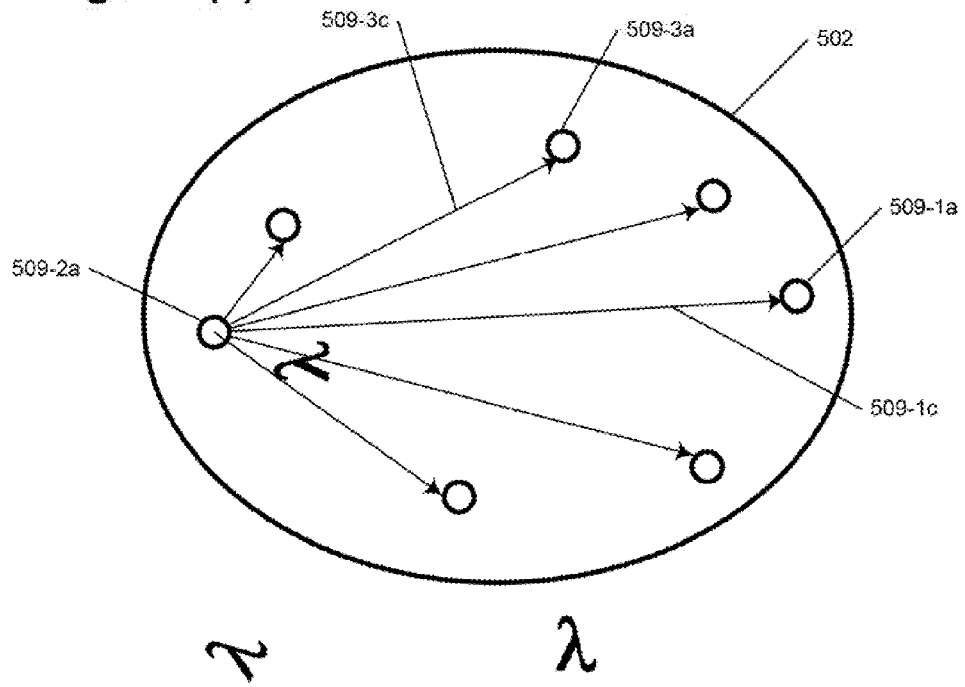

FIGS. 5(c) and 5(d) illustrate the analogous case to FIGS. 5(a) and 5(b) when the distances in classifier space are measured in absolute terms from the origin, rather than being measured relative to the position of an averaged, or mean face. For example, the color correlogram technique as used in our preferred embodiment is a classifier of this type which does not have the equivalent of a mean face.

We remark that the distances from the feature vector for the reference region [504-2a] and [509-2a] to the feature vectors for all other face regions in FIGS. 5(b) & (d) may be calculated in a number of ways. In the preferred embodiment we use the Euclidean distance but other distance metrics may be advantageously employed for certain classifiers other than those described here.

Figure 5E:
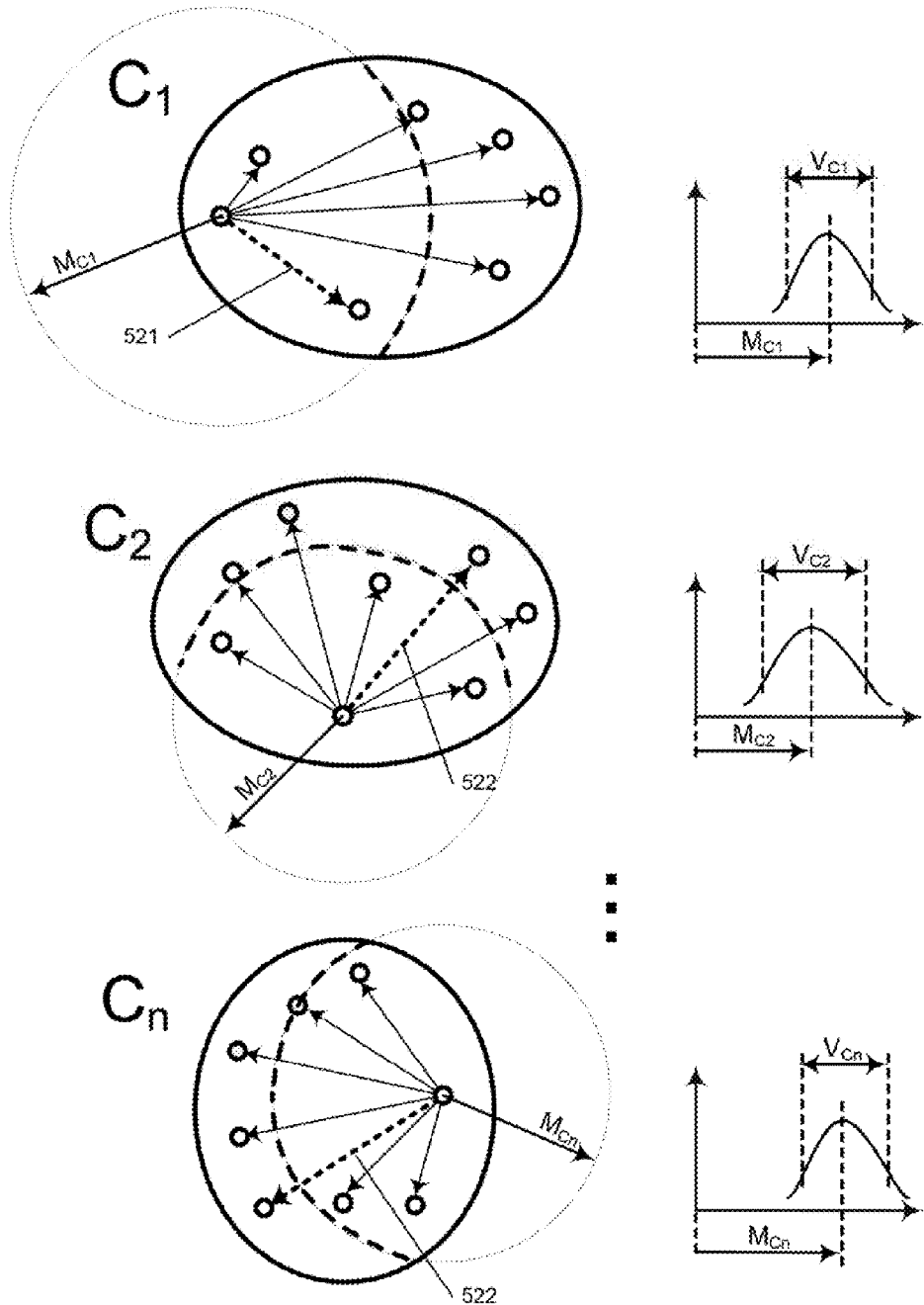

4. Methods for Combining Classifier Similarity Measures 4.1 Statistical Normalization Method FIG. 5(e) illustrates our primary technique for normalizing and combining the multiple classifiers described in this disclosure to reach a final similarity ranking.

The process is described for a set of multiple classifiers, $C_1, C_2 \ldots C_N$ and is based on a statistical determination of the distribution of the distances of all patterns relevant to the current classifier (face or peripheral regions in our embodiment) from the selected reference region. For most classifiers, this statistical analysis typically yields a normal distribution with a mean value $M_{Cn}$ and a variance $V_{Cn}$ as shown in FIG. 5(e). This is further illustrated in FIGS. 6(a), (b) & (c) which illustrate exemplary statistical distributions determined using the Wavelet/PCA technique of face recognition, FIG. 6(a); the DCT technique of face recognition, FIGS. 6(b) and the banded correlogram technique as applied to both hair and top-body clothing regions, FIG. 6(c). We remark that the determined statistical distribution is not always a normal distribution as illustrated by FIG. 6(b). We further remark that the bimodal form of the distribution illustrated in FIG. 6(c) occurs because it combines the distributions of hair and top-body regions; if these are separated and considered as two distinct classifiers then two separate normal distributions would result.

The combining of classifier similarity ranking measures (or, distances) is then determined by normalizing each classifier by this determined mean similarity ranking measure (distance) for that classifier, based on the reference region.

Thus the combined similarity ranking measure can now be determined quite simply as:

$$D_{tot} = D_1/M_{C1} + D_2/M_{C2} + D_n/M_{Cn}$$

A more sophisticated determination may optionally incorporate the standard deviation of the statistical distribution into the normalization process.

4.2 Determining Similarity Measures for Heterogenous Classifier Sets

So far we have been primarily concerned with cases where all classifiers are available for each reference region. In the context of our principle embodiment this implies that both face recognition classifiers, top-body correlogram classifier and the hair region correlogram classifier are available. However this is not always the case. We can say that the face region classifiers should always be available once a face region is successfully detected. Hereafter we refer to such classifiers as primary classifiers. In contrast the hair and clothing classifiers are not always available for close-up shots or where a face regions is towards the periphery of an image. Hereafter we refer to such classifiers as secondary classifiers.

Thus when the decision fusion process [824] performs a similarity determination across all stored patterns using all available classifiers, some patterns may not have associated secondary classifiers.

This may be dealt with in one of several ways:

(i) stored patterns without an associated secondary classifier may have the missing similarity measure for that classifier replaced with the maximum measure determined for that classifier; or (ii) such stored patterns may have said similarity measure replaced with the determined statistical mean measure for said classifier; or (iii) such patterns may be simply ignored in the search.

In case (i) these patterns will appear after patterns which contain all classifiers; in (ii) the effect of the missing classifier does not affect the ranking of the pattern which may appear interspersed with patterns which contain all classifiers while in (iii) these patterns will not appear in the ranked list determined by the decision fusion process.

A selection between these alternatives may be based on pre-determined criteria, on a user selection, or on statistical analysis of the distribution of the classifier across the pattern set.

4.3 Determining Similarity Measures for Multiple Reference Regions

A second modification of the decision fusion process arises when we wish to search for a combination of two, or more, reference regions co-occurring within the same image. In this case we process the first reference region according to the previously described methods to obtain a first set of similarity measures. The second reference region is then processed to yield a second set of similarity measures. This process yields multiple sets of similarity measures.

We next cycle through each image and determine the closest pattern to the first reference region; if only one pattern exists within an image then that image will not normally be considered. For each image where at least two patterns are present we next determine the closest pattern to the second reference region. These two similarity measures are next combined as illustrated in FIG. 10 where the normalized classifier similarity measures for reference region No. 1, D'11 [1101], D'21 [1102] and D'31 [1103] are combined with the normalized classifier similarity measures for reference region No. 2, D'12 [1105], D'22 [1106] and D'32 [1107]. This provides a combined similarity measure, Dtot, for that image (pattern grouping) and is recorded accordingly. After each image in the image collection is thus analyzed, a ranking list based on these combined similarity measures can be created and the relevant images sorted and displayed accordingly. A user interface for this decision fusion method is illustrated in FIGS. 8(a)-(d).

4.4 Employing User Input in the Combination Process

From the descriptions in 4.2 and 4.3 of the various methods of combining the normalized classifiers it is clear that, once the normalized classifiers for each pattern are determined, the main decision fusion process can combine these classifiers in a variety of ways and that the resulting images (pattern groupings) can be correspondingly sorted in a variety of ways with differing results.

Accordingly we illustrate in FIG. 9 an image browser user-interface for selecting between different combinations of classifiers. The user may select between using face recognition classifiers only [1002], a combination of face and top-body classifiers [1003], a full body region [1004] and a body pose classifier [1005] (see also "Face annotation for family photo album management" to Chen et al published in the International Journal of Image and Graphics Vol. 3, No. 1 (2003), hereby incorporated by reference).

Those skilled in the art will realize that alternative user interface embodiments are possible. Further, the activation buttons for these exemplary classifiers [1002, 1003, 1004 and 1005] may operate in a combinative manner. Thus, if multiple user interface components [1002, 1003, 1004 and 1005] are selected together, the decision fusion process within the image browser application can be modified to combine these classifiers accordingly. Further, additional UI components, such as sliders or percentage scales, can be used to determine weightings between the selected classifiers to allow the user additional flexibility in sorting & retrieving images.

5. User Interface Aspects

Figure 8A:
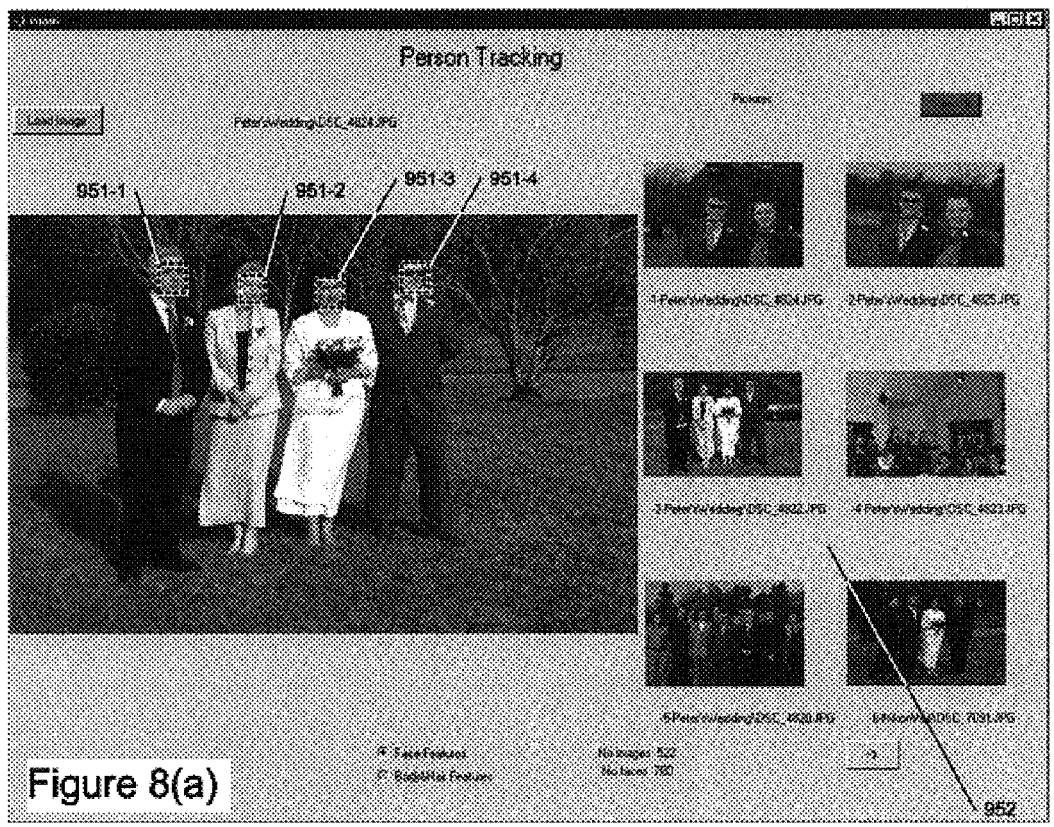

FIGS. 8(a) ... (d) illustrate the UI aspects of an alternative application which employs various software components in accordance with a preferred embodiment. The various steps of the image sorting/retrieval process are illustrated, starting with FIG. 8(a) which illustrates face regions [951-1], [951-2], [951-3] and [951-4] detected within an image. This image can be selected from a subdirectory on the computer file system containing an image collection, or, alternatively, through accessing a list of image links, preferably stored in a database, which define a set of images which are members of a currently selected image collection. Images from the collection are randomly sorted at this stage [952].

Figure 8B:
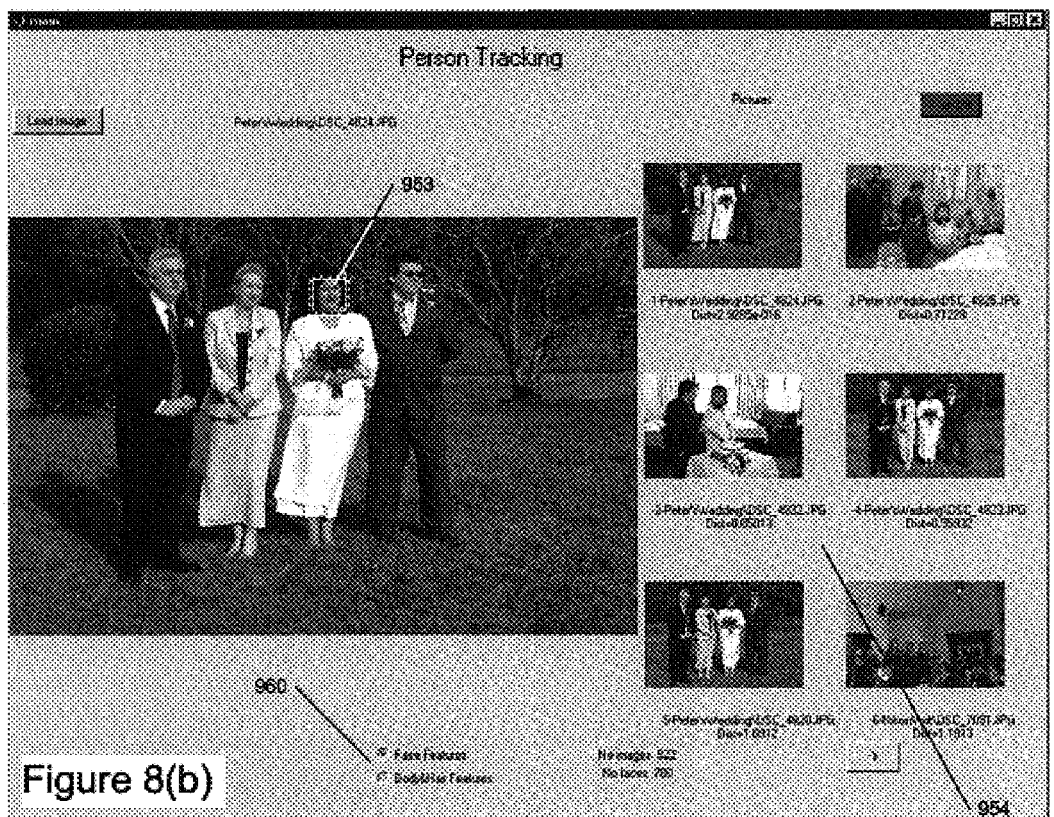

Next, in FIG. 8(b) at least one of the detected face regions [951-1], [951-2], [951-3] and [951-4] within an image is selected by the user [953]. The image collection is next sorted based on selected classifier, and in this instance as only the face recognition mode was selected [960] a set of sorted images ranked according to face region similarity is obtained [954].

Figure 8C:
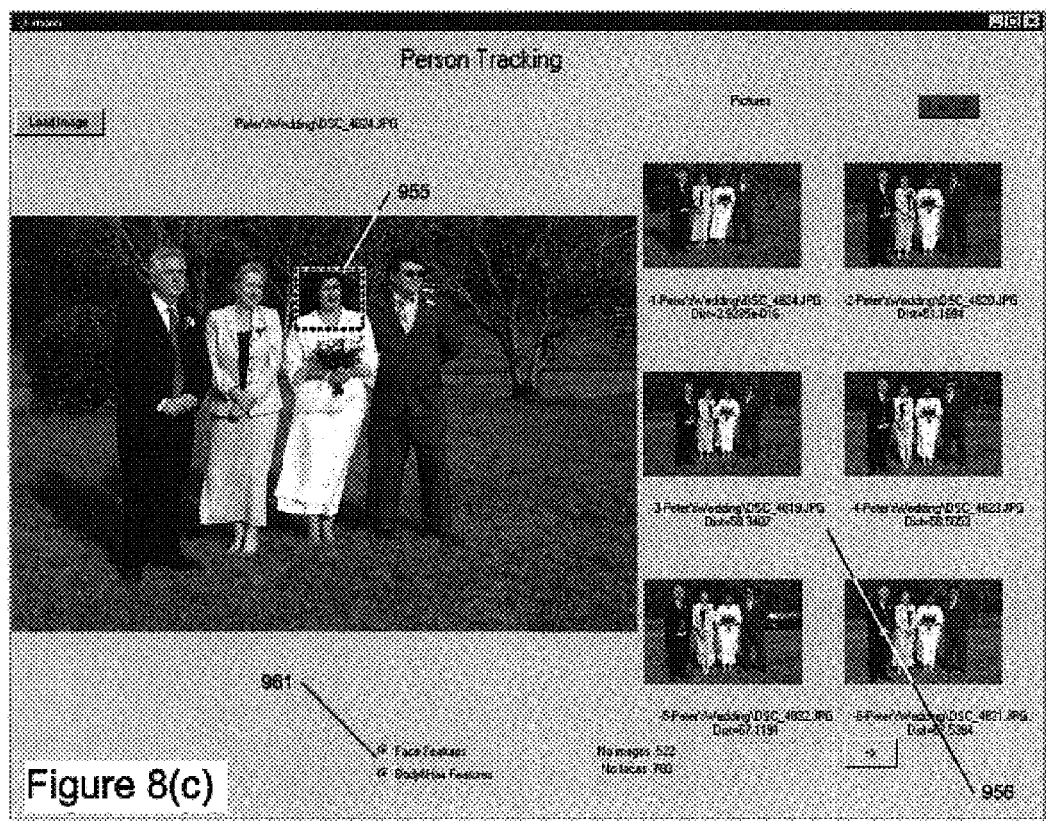

In FIG. 8(c) we illustrate the results when the peripheral regions of hair and upper body are included in the set of classifiers [961] used for sorting and ranking images within the collection. This selection may also be made by clicking on the face region [955] a second time which causes the marked region in the selected image to expand to include the shoulders and hair of the person selected. In this case we see that the images returned by the sorting & retrieval process are now determined not only by the persons face, but are also sorted according to the clothing and/or hairstyle in each image [956] in which that person occurs.

Figure 8D:
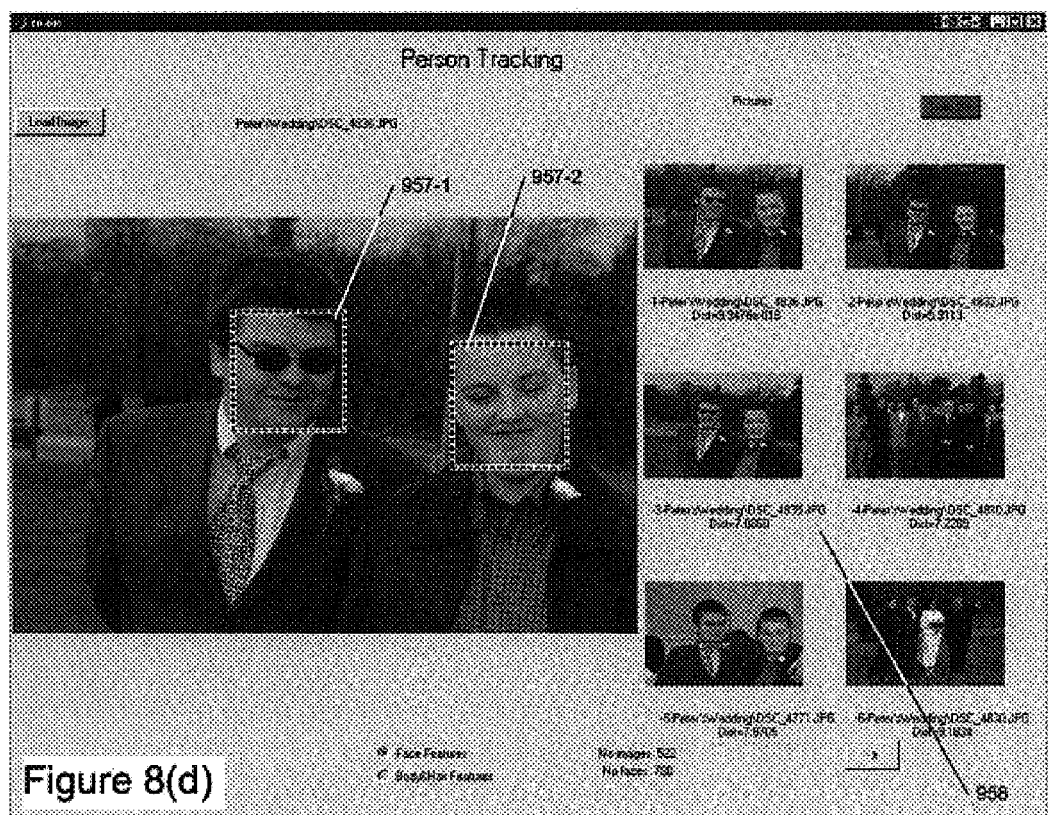

FIG. 8(d) illustrates a further aspect of the present invention which allows a collection to be searched for a co-occurrence of two, or more, persons within an image. In this case two (or more) face regions are selected from an image [957-1] and [957-2] and the image collection is searched for a co-occurrence of both faces. This is achieved by only considering images in which there are at least two determined face regions. Similarity measures are then determined between each face region selected for retrieval purposes and the face regions in each image which has at least two face regions; this leads to two sets of classifiers, $[C_{11}, C_{12} \ldots C_{1N}]$ and $[C_{21}, C_{22} \ldots C_{2N}]$. A statistical distribution is associated with each classifier as previously explained and illustrated in FIG. 5(e). These are now combined as illustrated in FIG. 10 to yield a combined similarity measure (distance) between the selected pair of faces and each image in the collection. The closest images are then displayed in the UI [958].

First Alternative Embodiment: Integration into OS Components

An alternative embodiment involving UI aspects is illustrated in FIG. 9. In this case, a system in accordance with a preferred embodiment has been integrated with an existing component of the operating system which performs the function of browsing the file/directory subsystem of a computer. In this embodiment, each subdirectory may be considered as containing an image collection and the training determination component described in FIG. 1(a) can be activated when a user switches to a subdirectory containing images. Further, both incremental and full training processes may be implemented as background processes so that they do not interfere with the normal activities of a user who simply wishes to browse files using the normal OS tools.

However, if the user selects a mode to sort images based on the faces occurring in them [1002], or the faces & clothing/hair features [1003] or the full body clothing [1004] or the body pose of a person [1005] the training mode may then switch to a foreground process in order to accelerate completion of the training process for the selected subdirectory (image collection). The image regions associated with each of these exemplary classifiers are shown as [1012], [1013], [1014] and [1015] in FIG. 9.

Once the training process is completed the face regions for the currently selected image become active as UI elements and a user may now select one or more persons from the image by clicking on their face. The sorted images are then displayed as thumbnails [1010] and the user may combine (or eliminate) additional classifiers from the UI by selecting/deselecting [1002], [1003], [1004] and [1005].

The image browser application illustrated in FIG. 9 further illustrates how the invention may be advantageously employed to allow sorting for images within multiple image collections. In the embodiment illustrated in FIG. 9, each subdirectory or folder of the left-hand browser window [1001] either contains a previously trained image collection, or a training process will be activated upon a user selection of an untrained image folder. In the discussion that follows each subdirectory is assumed to contain a previously trained image collection and an image collection data set comprising an image data record for each image which is a member of that collection.

The browser application supports two distinct means of searching multiple collections to find the nearest match to one or more face regions selected within the main browser image [1012]. In the context of this embodiment of the invention that may be achieved by selecting multiple image collections in the left-hand window of the image browser [1001].

In the first method the user selects multiple collections from the left-hand browser window [1001]. The selected face regions within the main image are next analyzed and feature vectors are extracted for each classifier based on the basis sets determined within the first selected image collection. Similarity measures are determined between the one or more selected face regions of the main image and each of the face regions within said first selected image collection for each of the classifier sets for which basis vectors are provided within that image collection data set. Normalization measures are determined and combined similarity measures are next determined for each face region within said first selected image collection. A list of these normalized combined similarity measures is stored temporarily.

This process is repeated for each of the selected image collections and an associated list of normalized combined similarity measures is determined. These lists are next combined and all images from the selected image collections are displayed according to their relative similarity measures in the bottom right-hand window [1010] of the image browser.

Figure 4C:
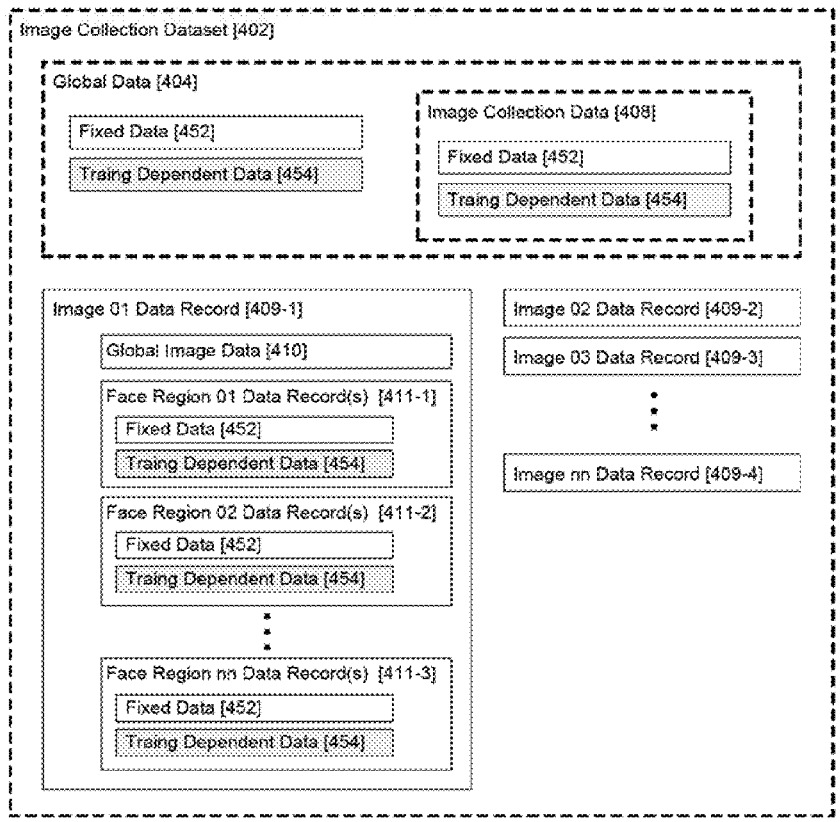
Figure 4D:
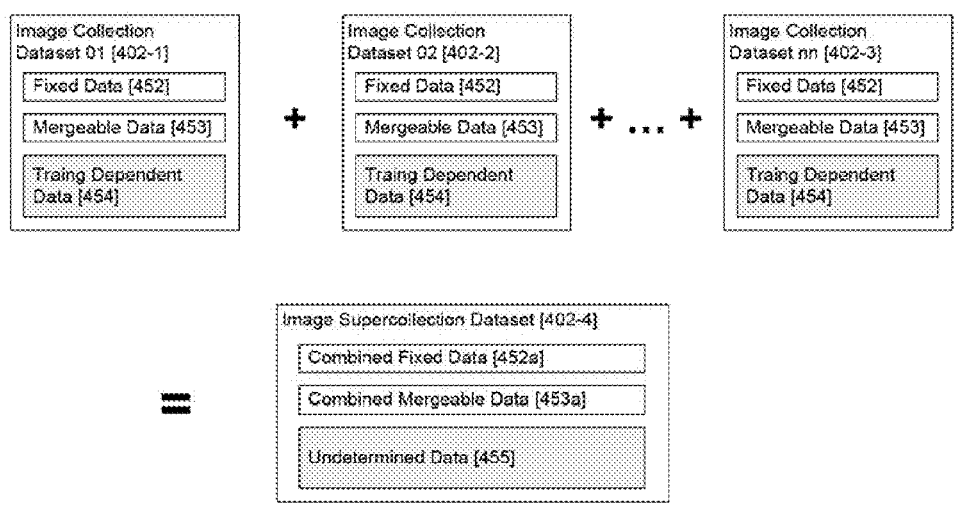

A second method of searching multiple collections combines these image collections into a new "super-collection". The collection data sets for each of the selected image collections are then loaded and merged to form a combined collection data set for this "super-collection". Certain data from the combined data set will now be invalid because it is dependent on the results of the training process. This is illustrated in FIGS. 4(c) & 4(d). Fortunately, the most time-consuming data to determine is that pertaining to the location of valid face regions and the normalization of these regions. All of this data can be reused.

The modified retraining process for such a "super-collection" is described above with reference to FIG. 2(d).

Thus, upon a user selection of multiple image collections the present invention allows a fast retraining of the combined image "super-collection". In this case the primary selection image presented in the main browser window [1012] will be from the combined image "super-collection" and the sorted images presented in the lower right-hand window [1010] are also taken from this combined "super-collection".

Second Alternative Embodiment: In-Camera Implementation

As imaging appliances continue to increase in computing power, memory and non-volatile storage, it will be evident to those skilled in the art of digital camera design that many aspects of the present invention could be advantageously embodied as an in-camera image sorting sub-system. An exemplary embodiment is illustrated in FIG. 11.

Following the main image acquisition process [1202] a copy of the acquired image is saved to the main image collection [1212] which will typically be stored on a removable compact-flash or multimedia data card [1214]. The acquired image may also be passed to an image subsampler [1232] which generates an optimized subsampled copy of the main image and stores it in a subsampled image collection [1216]. These subsampled images may advantageously be employed in the analysis of the acquired image.

The acquired image (or a subsampled copy thereof) is also passed to a face detector module [1204] followed by a face and peripheral region extraction module [1206] and a region normalization module [1207]. The extracted, normalized regions are next passed to the main image analysis module [1208] which generates an image data record [409] for the current image. The main image analysis module may also be called from the training module [1230] and the image sorting/retrieval module [1218].

A UI module [1220] facilitates the browsing & selection of images [1222], the selection of one or more face regions [1224] to use in the sorting/retrieval process [1218]. In addition classifiers may be selected and combined [1226] from the UI Module [1220].

Those skilled in the art will realize that various combinations are possible where certain modules are implemented in a digital camera and others are implemented on a desktop computer.

The invention claimed is:

1. A method for image recognition in a collection of digital images comprising:
   using a processor to perform the following steps:
      a) training a plurality of image classifiers, including:
      for each image in the collection, identifying any regions in the image corresponding to a face;
         for each face region and any associated peripheral region, for each of a plurality of image classifiers, determining feature vectors; and
      storing said feature vectors in association with data relating to the associated face region, and
         b) retrieving a sub-set of images from said collection, including:
      selecting from an image at least one reference region including a face to be recognized;
      selecting from said plurality of image classifiers, at least one classifier on which said retrieval is to be based;
      determining for said reference region, a respective feature vector for each selected classifier; and
         retrieving said sub-set of images from within said image collection in accordance with the distance between the feature vectors determined for said reference region and the feature vectors for face regions of said image collection
      wherein said step of determining feature vectors comprises:
   a. for each face region and any associated peripheral region, extracting respective features representative of the region;
   b. for each of said plurality of image classifiers, determining respective basis vectors according to said extracted features; and
   c. for the extracted features for each region, for each classifier, determining said feature vectors, based on each determined basis vector.

2. A method as claimed in claim 1 wherein said training step comprises:
   normalizing identified face regions and associated peripheral regions.

3. A method as claimed in claim 1 wherein said peripheral regions are indicative of hair, clothing and pose characteristics of a person associated with said identified face region.

4. A method as claimed in claim 1 wherein each basis vector for a classifier comprises a selected set of attributes and respective reference values for these attributes.

5. A method as claimed in claim 4 wherein the reference value for an attribute comprises an origin value.

6. A method as claimed in claim 4 wherein the reference value for an attribute comprises a mean value across all identified regions.

7. A method as claimed in claim 4 wherein each feature vector comprises an identified region's attribute values within the basis vector space relative to the reference value.

8. A method as claimed in claim 1 wherein said step of selecting a reference region comprises a user selecting a face region and any peripheral region from a reference image.

9. A method as claimed in claim 1 wherein said step of selecting a reference region comprises automatically identifying and selecting one or more face regions and any peripheral regions from a reference image.

10. A method as claimed in claim 1 wherein said step of determining feature vectors for said reference region, is responsive to determining that feature vectors have previously been determined for said reference region for said classifier, for retrieving said feature vectors from storage.

11. A method as claimed in claim 1 wherein retrieving said sub-set of images comprises, for each classifier, comparing feature vectors for the selected face region with feature vectors for face regions in the image collection to provide a set of distance measures.

12. A method as claimed in claim 1 wherein classifiers for face regions include a wavelet domain PCA (principle component analysis) classifier; and a 2-dimensional DCT (discrete cosine transform) classifier.

13. A method as claimed in claim 12 comprising filtering high frequency components from an identified face region prior to determining the feature vectors for said wavelet domain PCA classifier.

14. A method as claimed in claim 12 wherein determining a feature vector for a face region for said 2-D DGT classifier includes:
(i) transforming image information for an identified normalized face region to an indexed image using a 256 color gif colormap; and
(ii) applying a 2D DCT transform to said transformed image information to provide a spectrum for use as a feature vector for said face region.

15. A portable digital camera including a lens, an image sensor and a processor, and having an operating system embodied within a processor-readable medium for programming the processor to perform a method as claimed in claim 1.

16. A method for image recognition in a collection of digital images comprising:
using a processor to perform the following steps:
a) training a plurality of image classifiers, including:
for each image in the collection, identifying any regions in the image corresponding to a face;
for each face region and any associated peripheral region, for each of a plurality of image classifiers, determining feature vectors; and
storing said feature vectors in association with data relating to the associated face region, and
b) retrieving a sub-set of images from said collection, including:
selecting from an image at least one reference region including a face to be recognized;
selecting from said plurality of image classifiers, at least one classifier on which said retrieval is to be based;
determining for said reference region, a respective feature vector for each selected classifier; and
retrieving said sub-set of images from within said image collection in accordance with the distance between the feature vectors determined for said reference region and the feature vectors for face regions of said image collection, and
wherein retrieving said sub-set of images comprises, for each classifier, comparing feature vectors for the selected face region with feature vectors for face regions in the image collection to provide a set of distance measures; and
wherein the method further comprising calculating for each set of distance measures, mean and variance values.

17. A method as claimed in claim 16 comprising normalizing said set of distance measures using said mean and variance values.

18. A method as claimed in claim 17 comprising summing said normalized sets of distance measures for each selected classifier to provide a combined distance measure from said reference region to each region in said image collection.

19. A method as claimed in claim 18 comprising ranking each image in said image collection according to said combined distance measures and selecting said sub-set of images according to said ranking.

20. A method for image recognition in a collection of digital images comprising:
using a processor to perform the following steps:
a) training a plurality of image classifiers, including:
for each image in the collection, identifying any regions in the image corresponding to a face;
for each face region and any associated peripheral region, for each of a plurality of image classifiers, determining feature vectors; and
storing said feature vectors in association with data relating to the associated face region, and
b) retrieving a sub-set of images from said collection, including:
selecting from an image at least one reference region including a Thee to be recognized;
selecting from said plurality of image classifiers, at least one classifier on which said retrieval is to be based;
determining for said reference region, a respective feature vector for each selected classifier; and
retrieving said sub-set of images from within said image collection in accordance with the distance between the feature vectors determined for said reference region and the feature vectors for face regions of said image collection, and
wherein classifiers for face regions include a wavelet domain PCA (principle component analysis) classifier; and a 2-dimensional DCT (discrete cosine transform) classifier, and
wherein determining a feature vector for a face region for said wavelet domain PCA classifier includes:
(i) transforming image information for an identified normalized face region into a gray scale;
(ii) applying wavelet decomposition to said transformed image information to provide a sub-band representation of the face region;
(iii) performing histogram equalization on the sub-band representation; and
(iv) subtracting a mean sub-band value from the equalized sub-band representation.

21. A method for image recognition in a collection of digital images comprising:
using a processor to perform the following steps:
a) training a plurality of image classifiers, including:
for each image in the collection, identifying any regions in the image corresponding to a face;
for each face region and any associated peripheral region, for each of a plurality of image classifiers determining feature vectors; and
storing said feature vectors in association with data relating to the associated face region, and
b) retrieving a sub-set of images from said collection, including:
selecting from an image at least one reference region including a face to be recognized;
selecting from said plurality of image classifiers, at least one classifier on which said retrieval is to be based;

determining for said reference region, a respective feature vector for each selected classifier; and retrieving said sub-set of images from within said image collection in accordance with the distance between the feature vectors determined for said reference region and the feature vectors for face regions of said image collection, and wherein respective classifiers for peripheral regions are based on color histogram, color moment, colour correlogram, banded colour correlogram, and wavelet texture analysis.

22. A component embodied within a computer-readable medium for programming a processor to perform a method including image recognition in a collection of digital images, the component comprising:

a) training module for training a plurality of image classifiers, said module being arranged:

for each image in the collection, to identify any regions in the image corresponding to a face;

for each face region and any associated peripheral region, for each of a plurality of image classifiers, to determine feature vectors; and to store said feature vectors in association with data relating to the associated face region, and b) a retrieval module for retrieving a sub-set of images from said collection and arranged:

to select from an image at least one reference region including a face to be recognized;

to select from said plurality of image classifiers, at least one classifier on which said retrieval is to be based;

to determine for said reference region, a respective feature vector for each selected classifier; and to retrieve said sub-set of images from within said image collection in accordance with the distance between the feature vectors determined for said reference region and the feature vectors for face regions of said image collection, and said image browser comprising a user interface arranged to enable a user to define said image collection by selecting one or more folders from a hierarchy of folders, each of said one or more folders storing one or more images, and p1 wherein said training module is responsive to said user defined image collection containing images for two or more previously trained image collections for combining the basis vectors for said image collections.

23. A component as claimed in claim 22 in which said training module is arranged to identify any regions in the image corresponding to a face only once.

24. An image browser including a component as claimed in claim 22, said image browser comprising a user interface arranged to enable a user to define said image collection by selecting one or more folders from a hierarchy of folders, each of said one or more folders storing one or more images.

25. An image browser according to claim 22 wherein said training module is responsive to a user adding less than a threshold number of images to a previously trained image collection for determining feature vectors for face regions of said added images relative to existing basis vectors for each classifier.

26. An image browser according to claim 22, said user interface arranged to enable a user to define said image collection by selecting one or more images from one or more folders.

27. A component according to claim 22 comprising a user interface including a respective user interface device associated with each classifier and wherein said at least one classifier is user selected through selecting a corresponding at least one of said user interface devices.

28. An image acquisition device including a processor, and code embodied within a processor-readable medium for programming the processor to perform an image recognition method, including a component as claimed in claim 22.

29. A component embodied within a computer-readable medium for programming a processor to perform a method including image recognition in a collection of digital images, the component comprising:

a training module for training a plurality of image classifiers, said module being arranged:

for each image in the collection, to identify any regions in the image corresponding to a face;

for each face region and any associated peripheral region, for each of a plurality of image classifiers, to determine feature vectors; and to store said feature vectors in association with data relating to the associated face region, and b) a retrieval module for retrieving a sub-set of images from said collection and arranged:

to select from an image at least one reference region including a face to be recognized;

to select from said plurality of image classifiers, at least one classifier on which said retrieval is to be based;

to determine for said reference region, a respective feature vector for each selected classifier; and to retrieve said sub-set of images from within said image collection in accordance with the distance between the feature vectors determined for said reference region and the feature vectors for face regions of said image collection, and said image browser comprising a user interface arranged to enable a user to define said image collection by selecting one or more folders from a hierarchy of folders, each of said one or more folders storing one or more images, and wherein said training module is responsive to a user adding more than a threshold number of images to a previously trained image collection for re-calculating any existing basis vector for each classifier and determining feature vectors for all face regions of said image collection relative to said re-calculated basis vectors.

30. A component embodied within a computer-readable medium for programming a processor to perform a method including image recognition in a collection of digital images, the component comprising:

a training module for training a plurality of image classifiers, said module being arranged:

for each image in the collection, to identify any regions in the image corresponding to a face;

for each face region and any associated peripheral region, for each of a plurality of image classifiers, to determine feature vectors; and to store said feature vectors in association with data relating to the associated face region, and b) a retrieval module for retrieving a sub-set of images from said collection and arranged:

to select from an image at least one reference region including a face to be recognized;

to select from said plurality of image classifiers, at least one classifier on which said retrieval is to be based;

to determine for said reference region, a respective feature vector for each selected classifier; and to retrieve said sub-set of images from within said image collection in accordance with the distance between the feature vectors determined for said reference region and the feature vectors for face regions of said image collection, and further comprising a user interface including a respective user interface device associated with each classifier and wherein said at least one classifier is user selected through selecting a corresponding at least one of said user interface devices, and wherein each said user interface device includes a sub-component arranged to enable a user to set a weighting for each classifier.

31. A component according to claim 30 wherein said retrieval module is arranged to retrieve said sub-set of images from within said image collection for said reference region in accordance with a weighted distance between the feature vectors determined for said reference region and the feature vectors for face regions of said image collection.

* * * * *